United States Patent
Mashiko et al.

(12)

(10) Patent No.: US 6,288,766 B1
(45) Date of Patent: Sep. 11, 2001

(54) MANUFACTURING METHOD OF LIQUID CRYSTAL ELEMENT FOR INJECTING THE LIQUID CRYSTAL INTO THE CELL AND LIQUID CRYSTAL INJECTING DEVICE

(75) Inventors: Ryutaro Mashiko, Chiba; Mitsuhiro Shigeta, Kashiwa; Tomoo Furukawa, Toride; Teiyu Sako, Kuki; Hirokazu Sasaki, Kashiwa, all of (JP)

(73) Assignees: Sharp Kabushiki Kaisha, Osaka (JP); The Secretary of State for Defence in Her Britanic Majesty's Goverment of the United Kingdom of Great Britain and Northern Ireland, Farnborough (GB)

( * ) Notice: Subject to any disclaimer, the term of this patent is extended or adjusted under 35 U.S.C. 154(b) by 0 days.

(21) Appl. No.: 09/250,485

(22) Filed: Feb. 12, 1999

(30) Foreign Application Priority Data

Feb. 16, 1998 (JP) .................................................... 10-033345
Dec. 15, 1998 (JP) .................................................... 10-356735

(51) Int. Cl.⁷ ......................... G02F 1/1341; G02F 1/1339
(52) U.S. Cl. .......................... 349/189; 349/190; 349/153; 349/154
(58) Field of Search .................................... 349/189, 190, 349/153, 154

(56) References Cited

U.S. PATENT DOCUMENTS

| | | | | |
|---|---|---|---|---|
| 4,364,168 | * | 12/1982 | Matsuyama et al. | 29/592 R |
| 5,269,315 | * | 12/1993 | Yoshihara | 141/7 |
| 5,417,257 | * | 5/1995 | Shimamune et al. | 141/8 |
| 5,548,428 | * | 8/1996 | Masaki et al. | 359/80 |
| 5,699,138 | * | 12/1997 | Watanabe et al. | 349/189 |
| 5,724,114 | * | 3/1998 | Katagiri et al. | 349/134 |
| 5,835,181 | * | 11/1998 | Nakamura et al. | 349/189 |
| 5,838,482 | * | 11/1998 | Decroupet et al. | 359/253 |
| 6,014,188 | * | 1/2000 | Yamada et al. | 349/32 |
| 6,133,972 | * | 10/2000 | Fujimori et al. | 349/86 |
| 6,204,909 | * | 3/2001 | Jung et al. | 349/189 |

FOREIGN PATENT DOCUMENTS

| | | |
|---|---|---|
| 0590291A2 | 6/1994 | (EP) . |
| 04060614 | 2/1992 | (JP) . |
| 449691 | 8/1992 | (JP) . |
| 05220550 | 8/1993 | (JP) . |
| 05297386 | 11/1993 | (JP) . |
| 08095069 | 4/1996 | (JP) . |
| 08201821 | 8/1996 | (JP) . |
| 08220550 | 8/1996 | (JP) . |
| 09236810 | 9/1997 | (JP) . |

OTHER PUBLICATIONS

GB9903186.6 Search Report.

* cited by examiner

*Primary Examiner*—Kenneth Parker
*Assistant Examiner*—Mike Qi
(74) *Attorney, Agent, or Firm*—Renner, Otto, Boisselle & Sklar, LLP

(57) ABSTRACT

A liquid crystal injecting device has a jig which seals an opening used as a liquid crystal inlet of the cell and another opening used as an air outlet of the cell separately. When obtaining a liquid crystal element by injecting liquid crystal into the cell, the liquid crystal is applied to the inlet before the injection, and after an internal pressure of the cell is reduced by releasing air from the jig, the liquid crystal is injected to the cell by being supplied to the inlet through a liquid crystal supplying tube. During the injection, a temperature of the cell is set to a temperature at which the liquid crystal takes a nematic, cholesteric, or isotropic phase, while air is kept being released. When the injection ends, the liquid crystal is further applied to the inlet and outlet, while being reinjected into the cell through all the openings at room temperature or above under atmospheric pressure or above, after which the cell is cooled.

16 Claims, 14 Drawing Sheets

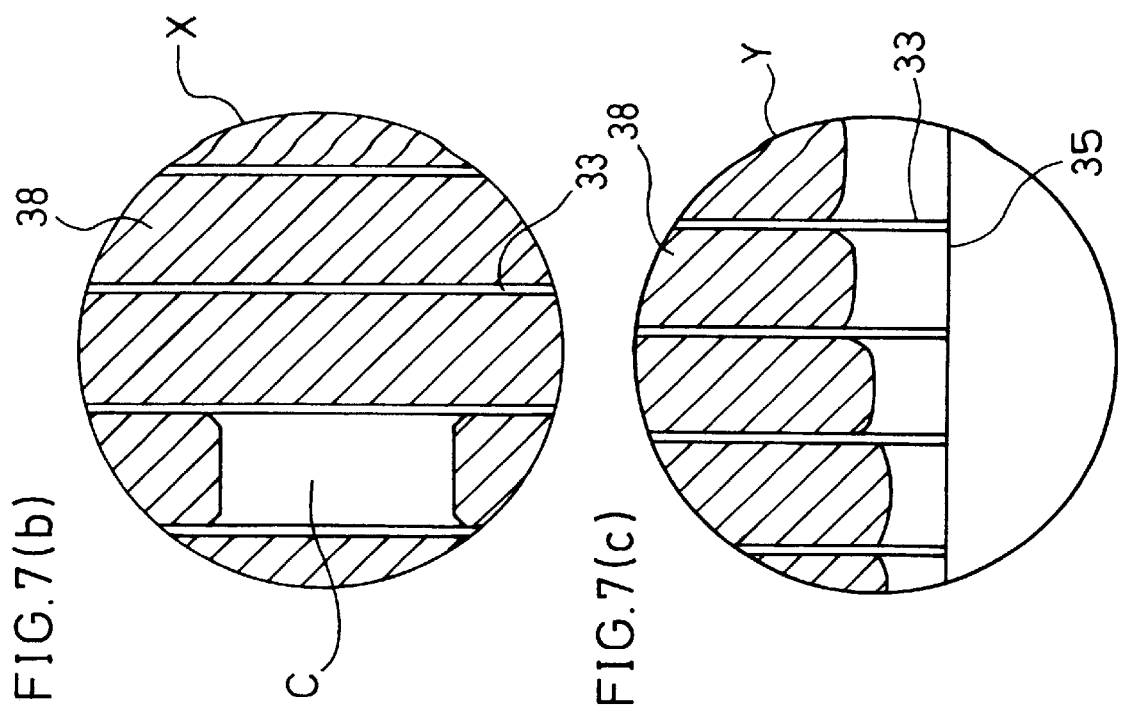
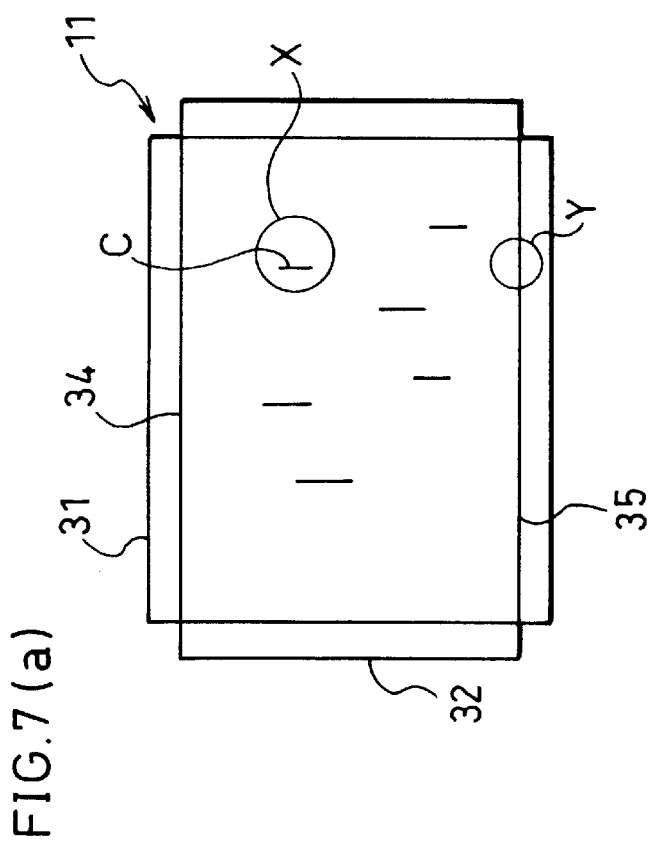
FIG.7(a)
FIG.7(b)
FIG.7(c)

MANUFACTURING METHOD OF LIQUID CRYSTAL ELEMENT FOR INJECTING THE LIQUID CRYSTAL INTO THE CELL AND LIQUID CRYSTAL INJECTING DEVICE

FIELD OF THE INVENTION

The present invention relates to a manufacturing method of a liquid crystal element, and a liquid crystal injecting device used in manufacturing the liquid crystal element.

BACKGROUND OF THE INVENTION

A liquid crystal element is conventionally produced by the following steps of: forming electrodes, alignment films, etc., and spacers when needed, on each of two substrates made of glass or the like; producing a cell by laminating these substrates in parallel with each other while keeping a minute space therebetween; and injecting liquid crystal into the space between the substrates.

Before these substrates are laminated, as shown in FIG. 12, a sealing agent 54 is applied around the circumference of a liquid crystal filling area 53 in at least one of the substrates (herein, substrate 52) except portions 51 which will be used as an inlet through which the liquid crystal is injected.

A conventional liquid crystal injecting device for injecting the liquid crystal into the cell and a conventional liquid crystal injecting method are shown in FIG. 13. More specifically, a liquid crystal reservoir 62 withholding the liquid crystal and a cell 63 are provided in a pressure reducing bath 61. After an internal pressure of the pressure reducing bath. 61 is reduced, the liquid crystal is supplied to an inlet of the cell 63 by dipping the inlet into the liquid crystal reservoir 62, for example. Then, the liquid crystal is injected into the cell 63 by a difference in pressure between the interior and exterior of the cell 63 given by increasing the internal pressure of the pressure reducing bath 61 as high as or higher than atmospheric pressure.

Another example of a conventional liquid crystal injecting device and a conventional liquid crystal injecting method are shown in FIG. 14. More specifically, an LC (Liquid Crystal) inlet 72 and an air outlet 73 are made through one of the opposing substrates which form the cell (herein, substrate 71). After displacing air in the cell through the LC inlet 72 and air outlet 73 by pressure reducing devices 77 and 78 which are equipped with vacuum pumps 75 and 76, respectively, liquid crystal 74 is injected into the cell through the LC inlet 72.

In case of injecting liquid crystal having a smectic phase, and therefore a high viscosity, such as ferroelectric liquid crystal, the liquid crystal is generally heated before the injection, so that the liquid crystal becomes less viscous and more fluid when injected. This process demands three following conditions:

(1) the cell of the liquid crystal element should be filled with the liquid crystal without leaving any unfilled area;

(2) the substrates forming the cell of the liquid crystal element should not be deformed, and the cell of the liquid crystal element should not be damaged; and (3) each step in the injecting process should not take long.

The first condition is required because if an unfilled area is left in the resulting liquid crystal element, not only the outward appearance is deteriorated, but also an operating life of the liquid crystal is shortened as the liquid crystal element is repeatedly driven.

The second condition is required for the following reason. That is, if the cell of the liquid crystal element is deformed, a cell gap between the substrates forming the cell varies, in response to which a threshold voltage is varied, the electrodes formed on the opposing substrates develop a short circuit, the alignment state of the liquid crystal is changed, etc., thereby making it impossible to attain satisfactory display quality. In particular, in case of the ferroelectric liquid crystal or anti-ferroelectric liquid crystal, since the cell gap is generally as small as 2 $\mu$m, the aforementioned inconveniences can readily occur with a very small variance. Moreover, when the substrate is deformed considerably, there arises another problem that the cell forming the liquid crystal element is readily damaged.

The third condition is required for the following reason. That is, as previously mentioned, since the liquid crystal injecting process involves the vacuuming step and heating step, if this process takes too long, some particular components contained in the liquid crystal may evaporate and the composition of the liquid crystal may be changed, or the liquid crystal may be deteriorated by heat. Further, the longer the liquid crystal injecting process, the lower the producing efficiency, thereby causing another problem that the manufacturing costs are undesirably increased.

To satisfy these conditions, many patent applications relating to the injecting method of the smectic liquid crystal have been filed, and some of them have been granted patents.

For example, Japanese Patent No. 18007010 discloses a liquid crystal injecting method. According to this injecting method, a cell applied with the smectic liquid crystal near its opening is placed in a pressure-resistant vessel, and air in the pressure-resistant vessel is displaced. Then, the cell is heated, so that the opening of the cell is closed with the heated and thus having become fluid smectic liquid crystal. Subsequently, reducing of the internal pressure of the vessel is stopped.

However, according to the injecting method of the above Japanese Patent, air in the cell is not readily displaced at the very initial stage of the air-displacing process, and for this reason, a difference in pressure between the interior and exterior of the cell is so small that the cell may be broken during the liquid crystal injecting step. This problem occurs more frequently with the cells of a larger size. This problem may be eliminated by reducing an internal pressure of the vessel more slowly. However, from the standpoint of satisfying the condition of shortening the injecting process, this solution is not preferable because a displacement rate decreases with increasing sizes of the cells.

In addition, the cell is heated while the ferroelectric liquid crystal is injected therein. However, if the injection method of the above Japanese Patent is adopted in this case, the substrates forming the cell may be deformed by heat, and the cell readily warps, and possibly, to the extent that it is broken. This problem also occurs more frequently with the cells of a larger size.

Moreover, since air in the cell is not displaced satisfactory, air left in the cell may be compressed when the liquid crystal is injected, and left as bubbles in the end. When air in the cell is not displaced satisfactory, a non-polymerized monomer of a high molecular film and moisture contained in color filters provided on the substrates forming the cell are left in the cell in the form of a gas, thereby making it impossible to inject the liquid crystal into the cell to its full.

Further, the smectic liquid crystal increases its volume (expands) when heated during the injecting step, and reduces its volume (contracts) when cooled later. Thus, even when the smectic liquid crystal is injected fully into the cell at the injecting step, cavitation may occur due to the volume loss (contraction) of the smectic liquid crystal in the cooling step, thereby causing deficient injection of the liquid crystal.

A method disclosed in Japanese Laid-open Patent Application No. 297386/1993 (Japanese Official Gazette, Tokukaihei No. 5-297386) is suitably used to cut the injection time shorter and eliminate residual bubbles. According to this method, at least one injection hole and at least one air-releasing hole are provided at the circumference of the cell, and air in the cell is displaced through these holes, after which the liquid crystal is injected into the cell through the injection hole while air is kept released from the air-releasing hole.

Also, a method disclosed in Japanese Laid-open Patent Application No. 220550/1996 (Japanese Official Gazette, Tokukaihei No. 8-220550) is suitably used to eliminate the cavitation. According to this method, after the phase of the smectic liquid crystal which has been injected into the cell is restored to isotropic phase, the cell is filled with another smectic liquid crystal with an application of pressure.

However, in case of the smectic liquid crystal which has to be heated when injected, it is very difficult to eliminate the cavitation by the method of Japanese Laid-open Patent Application No. 297386/1993. Also, once the bubbles are left in the cell, they can not be eliminated by the method of Japanese Laid-open Patent Application No. 220550/1996 even if a pressure is applied.

Further, the cavitation can not be eliminated completely by the method of Japanese Laid-open Patent Application No. 220550/1996 for the following reason. That is, the flowing rate of the liquid crystal, flowing into the space between the opposing two substrates forming the cell, starts to drop as its top approaches to the air outlet, thereby extending the injection time. Thus, unfilled areas are readily produced near the air outlet. Moreover, since the cell filled with the liquid crystal is cooled to produce the liquid crystal element, the cavitation may occur in the cell of the liquid crystal element due to the volume loss of the liquid crystal.

SUMMARY OF THE INVENTION

It is therefore an object of the present invention to inject the liquid crystal cell into a cell in a short time without deforming or damaging a cell of the liquid crystal element, while eliminating an occurrence of unwanted deficient injection of the liquid crystal, bubbles, and cavitation.

To fulfill the above an d other objects, a manufacturing method of a liquid crystal element by injecting liquid crystal into a cell composed of a pair of opposing substrates, at least one of which transmitting light, and provided with at least two openings, is characterized by being composed of:

a liquid crystal applying step of applying liquid crystal to at least one of the openings and a vicinity thereof;

a cell's internal pressure reducing step of releasing air from an interior of the cell through at least one of the openings to lower an internal pressure of the cell than an external pressure thereof;

a cell temperature setting step of setting a temperature of the cell to a temperature at which the liquid crystal to be injected therein takes one of a nematic, cholesteric, and isotropic phase;

a liquid crystal injecting step of injecting the liquid crystal into the cell through the opening to which the liquid crystal has been applied while air being kept released from the cell;

a liquid crystal re-injecting step of applying the liquid crystal to all the openings of the cell, and re-injecting the liquid crystal through all the openings at room temperature or above under atmospheric pressure or below; and a cell cooling step of cooling the cell to room temperature after the liquid crystal has been re-injected into the cell.

The above method can be applied to either of a cell whose opposing two edges are fully opened, or a cell provided with a plurality of small inlets on one of the edges.

According to the above method, the liquid crystal injected into the cell through at least one of the openings proceeds in a specific direction toward an air outlet. Hence, a shortest injection path can be chosen, thereby cutting a time necessary for the injection shorter. In addition, there is an advantage that the resulting liquid crystal element as a whole has a uniform alignment.

Further, according to the above method, the liquid crystal is applied to at least one opening or the vicinity thereof in the liquid crystal applying step. Hence, the opening is closed with the liquid crystal when the cell is heated because a viscosity of the applied liquid crystal drops with heating. Since the liquid crystal is injected into the opening in the liquid crystal injecting step in a state where air in the cell is satisfactory released, it is sufficient to supply the liquid crystal in exactly a necessary amount, thereby eliminating exceeding consumption of the liquid crystal. In addition, since a liquid crystal injecting time is cut shorter accordingly, a liquid crystal heating time when injecting the liquid crystal can be cut shorter, thereby preventing deterioration of the liquid crystal by heat. Moreover, as has been explained, since the liquid crystal is injected after air is released from cell in a satisfactory manner by applying the liquid crystal to the opening or the vicinity thereof in the liquid crystal applying step, deairing of the cell and deairing of the liquid crystal can be performed simultaneously. In short, the deairing of the cell and deairing of the liquid crystal do not have to be performed in separate steps (different chambers).

Also, unlike the conventional liquid crystal injecting method, since air is released from the interior of the cell without reducing an external pressure of the cell, separation of the substrates (liquid crystal element substrates) forming the cell caused by a negative pressure in the cell's internal pressure reducing step before the liquid crystal injection can be prevented. Further, by keeping air being released from the interior of the cell, the liquid crystal injecting step can be performed in a state where a pressure higher than pressures at a liquid crystal inlet and an air outlet is applied to the center of the cell from the outside of the cell. Consequently, the substrates are pressed against each other by the external pressure, and separation of the substrates caused when injecting the liquid crystal can be prevented.

Also, since the temperature of the cell is set to a temperature at which the liquid crystal to be injected therein takes a nematic, cholesteric, or isotropic phase before the liquid crystal is injected, liquid crystal with a relatively high viscosity, such as ferroelectric liquid crystal, can be injected smoothly because the viscosity of a liquid crystal material is reduced due to the heating.

Moreover, even if the liquid crystal is injected with heating, since a pressure is higher than the pressures at the liquid crystal inlet and air outlet is applied to the center of the cell from the outside of the cell, a pair of the substrates forming the cell are pressed against each other, thereby preventing warps and damages of the substrates. Consequently, it has become possible to inject the liquid crystal into the cell smoothly without causing defective injection or giving damages to the substrates (liquid crystal element substrates) forming the cell.

Further, since the liquid crystal is applied to all the openings before the liquid crystal is re-injected in the liquid crystal re-injecting step, a drop in the proceeding rate of the liquid crystal near the air-releasing opening can be reduced, thereby making it possible to cut the liquid crystal injecting time shorter. For this reason, no area is left unfilled with the liquid crystal near the air outlet, and therefore, cavitation caused by a volume loss (contraction) of the liquid crystal when it is cooled later can be eliminated. Moreover, the liquid crystal is re-injected into the cell at or above room temperature under atmospheric pressure or below. Hence, the liquid crystal becomes more fluid and is more readily pushed into the interior from the exterior of the cell. In short, the liquid crystal can be readily re-injected into the cell.

As has been discussed, according to the manufacturing method of the liquid crystal element of the present invention, the liquid crystal can be injected into the cell in a shorter time compared with the conventional method without causing deficient injection or giving damages to the substrates (liquid crystal element substrates) forming the cell.

Also, to fulfill the above and other objects, a liquid crystal injecting device for injecting liquid crystal into a cell composed of a pair of opposing substrates, at least one of which transmitting light, and provided with at least one opening, is characterized by being furnished with:

at least one liquid crystal injecting section having a vessel capable of increasing and decreasing an internal pressure thereof, and a pressure adjusting member for adjusting an internal pressure of the cell independently of an external pressure of the cell through the opening of the cell, said cell being sealed airtight in said vessel; and an airtight sealing bath capable of increasing and decreasing an internal pressure thereof, and enclosing at least one liquid crystal injecting section therein.

According to the above arrangement, a difference in pressure is produced between the interior and exterior of the cell by adjusting an internal pressure of the cell by the pressure adjusting member independently of the exterior pressure of the cell through the opening of the cell sealed airtight in the vessel. In other words, different from the conventional method, air can be released from the interior of the cell without placing the entire cell in a pressure-reduced space. Consequently, separation of the substrates due to a negative pressure caused when injecting the liquid crystal can be prevented, and the liquid crystal can be injected into the cell in a shorter time compared with the conventional method without causing deficient injection and giving damages to the substrates (liquid crystal element substrates).

Further, according to the above arrangement, since the liquid crystal injecting device includes the airtight sealing bath capable of increasing and decreasing an internal pressure thereof, and enclosing the liquid crystal injecting section therein, the entire cell is enclosed in a space where an internal pressure is increased to atmospheric pressure or above. Consequently, the liquid crystal can be injected into the cell in a shorter time compared with the conventional method without deforming or breaking the cell of the liquid crystal element while preventing the occurrence of unwanted deficient injection, bubbles, and cavitation.

Further, to fulfill the above and other objects, a liquid crystal injecting device for injecting liquid crystal into a cell composed of a pair of opposing substrates, at least one of which transmitting light, and provided with at least two openings, is characterized by being furnished with:

at least one liquid crystal injecting member having an airtight sealing member for separately sealing one of the openings used to inject the liquid crystal into the cell and one of the openings used to release air from an interior of the cell, and a pressure adjusting member for adjusting pressures separately at an airtight sealing portion of the opening used to inject the liquid crystal into the cell and at an airtight sealing portion of the opening used to release air from the interior of the cell; and an airtight sealing bath capable of increasing and decreasing an internal pressure thereof, and enclosing at least one liquid crystal injecting section therein.

According to the above arrangement, the pressures at the airtight sealed portions of the injection opening and the air-releasing opening are adjusted independently. Thus, even if air has not been released from the cell in a satisfactory manner when the injection of the liquid crystal starts, air can be kept released during the injection. Consequently, compared with the above liquid crystal injecting device, a time required to reduce an internal pressure of the cell before the liquid crystal injection can be shortened further. Moreover, since a degree of vacuum in the above pressure-reducing does not have to be as high as the one in the conventional method, the liquid crystal can be readily injected into the cell. Also, if vacuum valves are provided adequately, it is no long necessary to provide vacuuming pumps for vacuum releasing separately in the airtight sealing bath enclosing the liquid crystal injecting device and the airtight sealed portion. Consequently, a compact and simplified liquid crystal injecting device can be provided.

Also, according to the above arrangement, a difference in pressure between the interior and exterior of the cell is produced by adjusting the internal pressure of the cell independently of the external pressure of the cell through the injection opening and the air-releasing opening sealed airtight in the airtight sealing member. In other words, different from the conventional method, air can be released from the interior of the cell without placing the entire cell in a pressure-reduced space. Consequently, separation of the substrates due to a negative pressure caused when injecting the liquid crystal can be prevented, and the liquid crystal can be injected into the cell in a shorter time compared with the conventional method without causing deficient injection and giving damages to the substrates (liquid crystal element substrates).

Further, according to the above arrangement, since the liquid crystal injecting device includes the airtight sealing bath capable of increasing and decreasing an internal pressure thereof and, enclosing the liquid crystal injecting section therein, the entire cell is enclosed in a space where an internal pressure is increased to atmospheric pressure or above. Consequently, the liquid crystal can be injected into the cell in a shorter time compared with the conventional method without deforming or breaking the cell of the liquid crystal element while preventing the occurrence of unwanted deficient injection, bubbles, and cavitation.

Moreover, in case that the above liquid crystal injecting device further includes a gas introducing member for introducing an inert gas into the airtight sealing bath, by introducing the inert gas from the gas introducing member, the liquid crystal can be injected into the cell in a state where air in the airtight sealing bath is replaced with the inert gas. Thus, even when a used liquid crystal material has a high viscosity and requires heat treatment when injected, such as ferroelectric liquid crystal, it has become possible to prevent deterioration of the characteristics of the liquid crystal material caused when the liquid crystal material reacts with oxygen in air.

For a fuller understanding of the nature and advantages of the invention, reference should be made to the ensuing detailed description taken in conjunction with the accompanying drawings.

BRIEF DESCRIPTION OF THE DRAWINGS

FIG. 7(a) is a view explaining a state where cavitation occurs in a resulting liquid crystal element due to the cooling after the liquid crystal is injected;

FIG. 7(b) is another view explaining the state where cavitation occurs in a resulting liquid crystal element due to the cooling after the liquid crystal is injected;

FIG. 7(c) is an enlarged view explaining a state near an air outlet of the liquid crystal element when the injection of the liquid crystal is substantially completed;

DESCRIPTION OF THE EMBODIMENTS

Embodiment 1

Referring to FIGS. 1 through 9, the following description will describe an example embodiment of the present invention.

Figure 3:
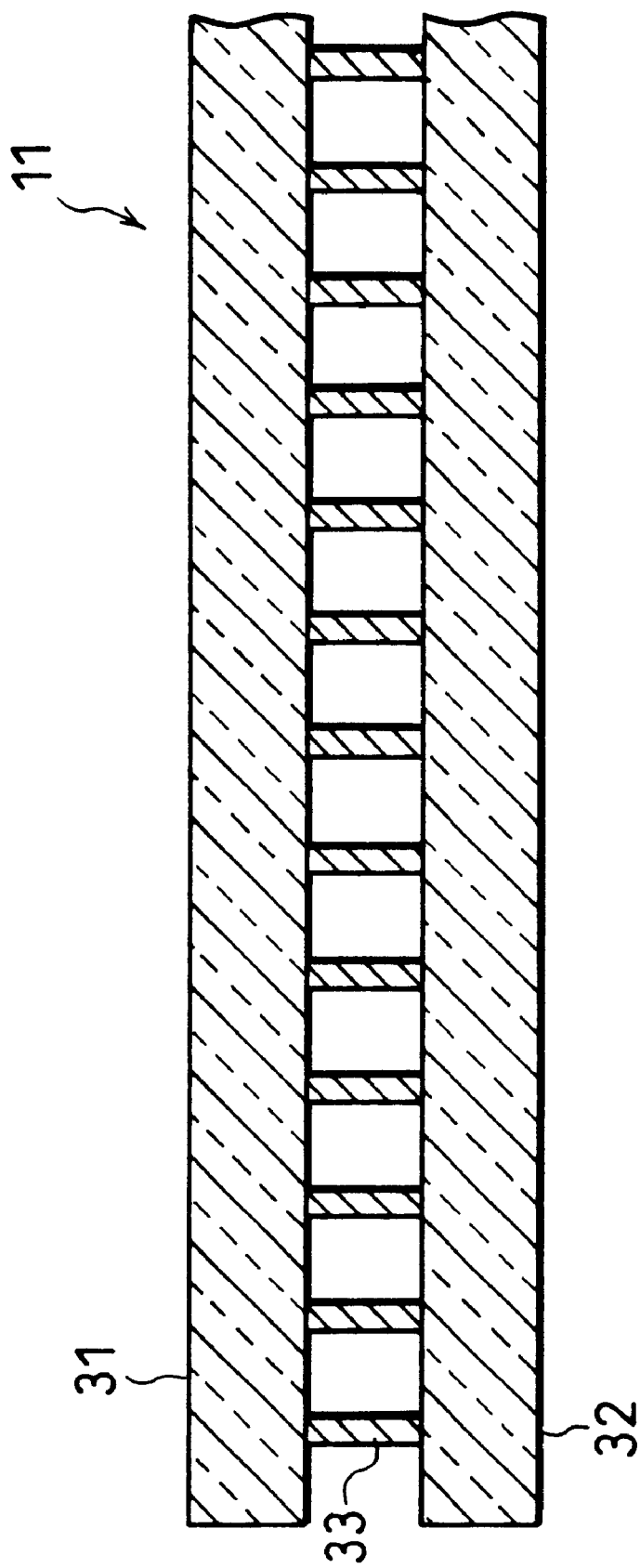
FIG. 3 is a cross section schematically showing an arrangement of the cell.
Figure 4:
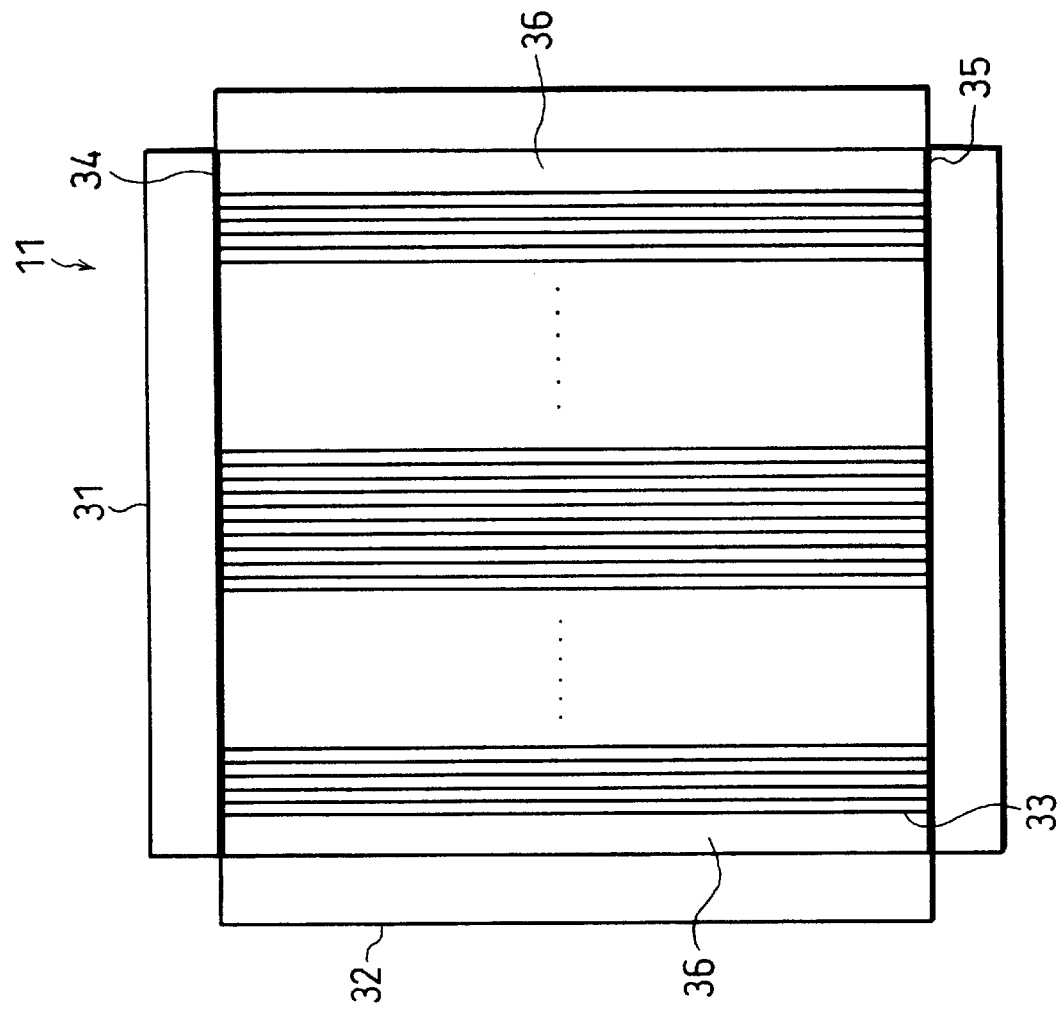
FIG. 4 is a plan view schematically showing the arrangement of the cell.

The following will explain, with reference to FIGS. 3 and 4, a suitable arrangement of a cell in injecting liquid crystal into the same by a liquid crystal injecting device of the present embodiment when producing a liquid crystal element.

As shown in FIG. 3, a cell 11 used in the present embodiment is composed of a pair of substrates 31 and 32 made of glass or the like, and wall spacers 33 which have uniform height and width are provided in stripes to be parallel with each other.

The opposing surfaces of the substrates 31 and 32 are provided with a plurality of electrodes made of conductive materials, such as ITO, and an alignment film made of, for example, polyimide, to which alignment treatment has been applied.

The electrodes are provided in such a manner that those provided on the same substrate are aligned in parallel, while those provided on the substrate 31 intersect at right angles with those provided on the other substrate 32.

The spacers 33 are provided in parallel with the electrodes aligned on either of the substrates 31 and 32.

Here, transparent electrodes and the alignment film are not illustrated in the drawings for ease of explanation. Also, the substrates 31 and 32 may be provided further with an insulation film, or films of other kinds, when needed.

As indicated by bold lines in FIG. 4, one of the two edges of the cell 11 which intersect at right angles with the spacers 33 is used entirely (full width) as an inlet (liquid crystal injecting opening) 34 for liquid crystal 38 (refer to FIG. 5), while the other edge is used entirely (full width) as an air outlet (air-releasing opening) 35.

A sealing member 36 is provided along each of the two edges of the cell which are parallel to the spacers 33 in such a manner as to close a space between the substrates 31 and 32. Note that, however, the sealing members 36 can be omitted if the outermost spacers 33 function as the sealing members.

Figure 1:
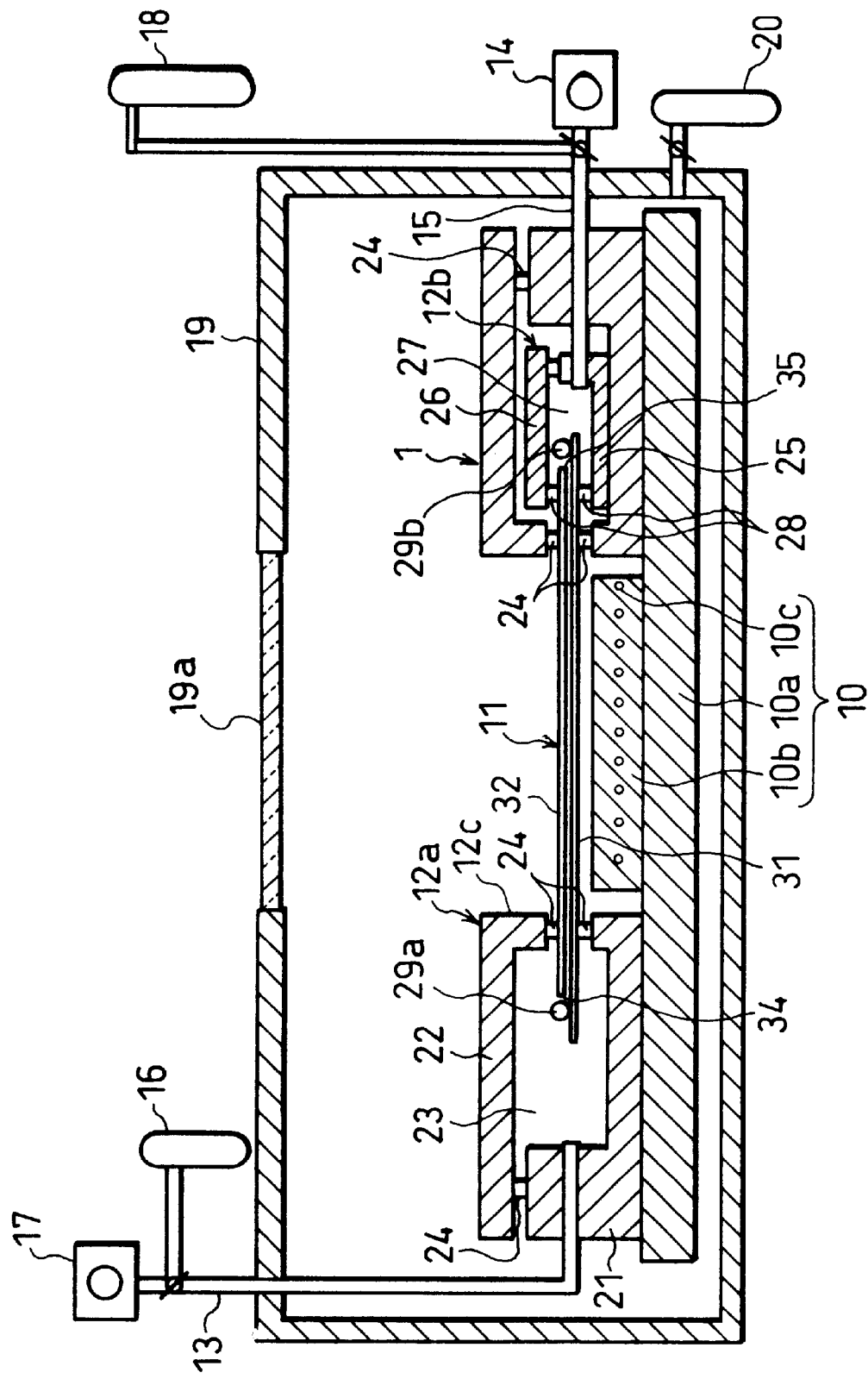
FIG. 1 is a cross section showing an arrangement of a liquid crystal injecting device in accordance with an example embodiment of the present invention.
Figure 2:
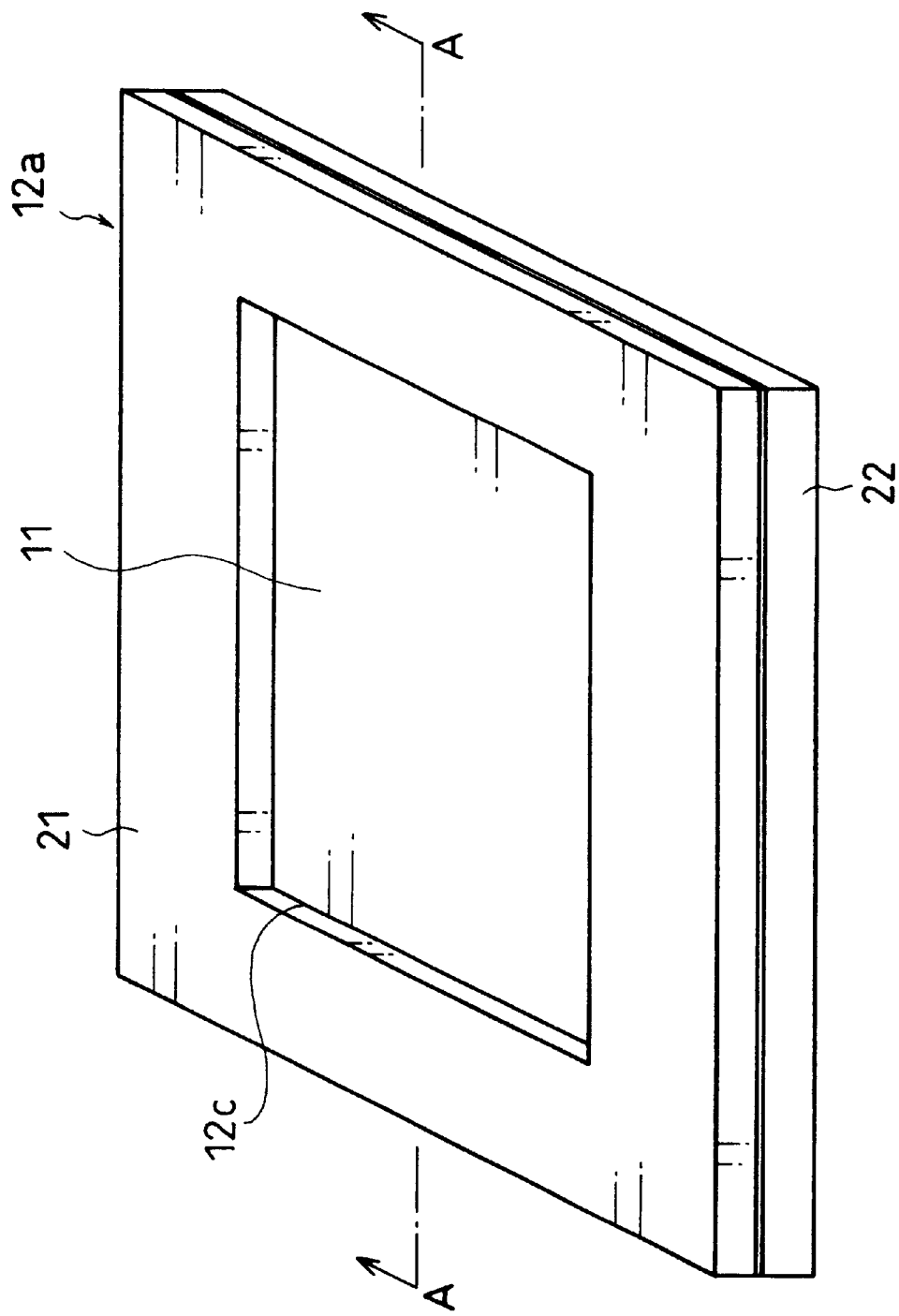
FIG. 2 is a perspective view showing a cell provided to a liquid crystal injecting section of the liquid crystal injecting device.

Next, with reference to FIGS. 1 and 2, the following will explain an arrangement for injecting the liquid crystal 38 into the cell 11 and the injecting procedure of the liquid crystal 38.

FIG. 1 is a cross section showing an arrangement of a liquid crystal injecting system (liquid crystal injecting device) in accordance with the present embodiment, and FIG. 2 is a perspective view showing the cell 11 provided in a liquid crystal injecting device 1 (liquid crystal injecting section) of the present liquid crystal injecting system. The cross section of FIG. 1 coincides with a cross section taken on line A—A of FIG. 2.

As shown in FIG. 1, the liquid crystal injecting system in accordance with the present embodiment is composed of a pressure-applying bath 19 (airtight bath) which is furnished with a hot plate 10 and used as a vessel capable of increasing and decreasing its internal pressure, the liquid crystal injecting device 1 provided in the pressure-applying bath 19, and vacuum pumps 14 and 17 and compressed-nitrogen cylinders 16, 18 and 20 which will be described below.

An arrangement of the liquid crystal injecting device 1 will be explained in detail. The liquid crystal injecting device 1 has a jig 12a (vessel), which sandwiches four edges of the cell 11 from above and beneath. The jig 12a is mainly composed of a rigid body 21 which supports the cell 11 from beneath, and another rigid body 22 which opposes the rigid body 21 and thereby sandwiches the cell 11 with the rigid body 21.

Each of the rigid bodies 21 and 21 has a rectangular opening 12c at the center. In other words, as shown in FIGS. 1 and 2, when the cell 11 is set in the jig 12a, only the four edges and the vicinity thereof are isolated from the outside of the jig 12a by the rigid bodies 21 and 22, and the center of the cell 11 alone is exposed to outside of the jig 12a through the opening 12c.

As shown in FIG. 1, when opposed each other, the rigid bodies 21 and 22 produce a space 23 which surrounds the inlet 34 and the vicinity thereof, and the outer circumference of the cell 11 is sealed airtight in the space 23 thus produced.

In order to seal the space 23 airtight, an elastic body 24, such as an O-ring, is provided in a space between the rigid bodies 21 and 22 along the inner and outer circumferences thereof. Note that the surface of the elastic body 24 touching the cell 11 is applied with surface treatment, so that, when the substrates 31 and 32 (substrate glass) expand with heating, they can glide on that surface to absorb the movement derived from the expansion.

Further, the liquid crystal injecting device 1 has a jig 12b (vessel) in the jig 12a (that is, the space 23 formed between the rigid bodies 21 and 22) as airtight means for airtightening the air outlet 35 of the cell 11 alone by isolating the same from the space 23 in the jig 12a.

The jig 12b is mainly composed of a rigid body 25 for supporting the cell 11 from beneath, and another rigid body 26 opposing the rigid body 25 and thereby sandwiching the cell 11 with the rigid body 25.

When opposed each other, the rigid bodies 25 and 26 of the jig 12b produces a space 27 which surrounds the air outlet 35 and the vicinity thereof. In order to seal the space 27, an elastic body 28 is provided in a space between the rigid bodies 25 and 26 to close a space between an opening of the rigid bodies 25 and 26 and the cell 11.

By sealing the space between the cell 11 and rigid bodies 25 and 26 airtight with the elastic body 28 in the vicinity of the air outlet 35 of the cell 11 in the above manner, the air outlet 35 and the vicinity thereof are sealed airtight in the space 27 alone. According to this arrangement, if the thickness of the cell 11 varies slightly in each liquid crystal element, the elastic body 28 can absorb such variance in thickness, thereby ensuring the airtightness of the jig 12b. Consequently, compared with the conventional method, the liquid crystal 38 can be injected into the cell 11 in a shorter time without causing deficient injection or giving damages to the substrates 31 and 32 (liquid crystal element substrates) forming the cell 11.

In addition, like the elastic body 24, the surface of the elastic body 28 touching the cell 11 is applied with surface treatment, so that, when the substrates 31 and 32 (substrate glass) expand with heating, they can glide on that surface to absorb the movement derived from the expansion.

As has been explained, the liquid crystal display 1 is arranged in such a manner that the four edges of the cell 11 are sealed airtight by the jig 12a, and one of the four edges used as the air outlet 35 is sealed airtight dually by the jig 12a and jig 12b (double airtight sealing).

The hot plate 10 provided in the pressure-applying bath 19 is composed of a plate portion 10a and a protrusion portion 10b, and arranged in such a manner that, when the liquid crystal injecting device 1 is placed thereon, the protrusion portion 10b comes out through the opening of the rigid bodies 21 and 22 of the jig 12a. By providing the protrusion portion 10b to the hot plate 10 in such a manner as to approximate or touch the liquid crystal injecting device 1 or cell 11, one of the substrates 31 and 32 whichever is closer to or touches the hot plate 10 (herein, substrate 31) is heated while keeping its in-plane temperature substantially even, thereby making it possible to heat the entire cell 11 evenly. Moreover, the injecting rate of the liquid crystal 38 is increased, and therefore, a time necessary to inject the liquid crystal 38 can be cut shorter. Furthermore, there is offered another advantage that deficient injection can be prevented. In addition, since the hot plate 10 heats the cell 11 in the pressure-applying bath 19 (airtight bath), a temperature of the cell 11 can be readily adjusted.

Further, the hot plate 10 is furnished with a tubing 10c as a heating and cooling source provided to approximate to or touch the liquid crystal injecting device 1 or cell 11, throughout which a nitrogen gas or vapor circulates. Consequently, for example, in case that the liquid crystal 38 is ferroelectric liquid crystal having a relatively high viscosity, the liquid crystal 38 becomes less viscous with heating by the heating source, thereby making it possible to increase the injecting rate. Also, when the cell 11 is cooled after the injection of the liquid crystal 38, an optimal cooling rate can be set by the cooling source.

In order to release air from the space 27 in the jig 12b, the present system has the vacuum pump 14 as a pressure adjusting member (pressure adjusting means) at the outside of the pressure-applying bath 19, and a pipe 15 to link the jig 12a to the vacuum pump 14.

The pipe 15 branches somewhere in the middle, and one of the branches is connected to the compressed-nitrogen cylinder 18 (pressure adjusting member (pressure adjusting means)) which introduces nitrogen to leak a pressure.

Further, in order to release air from the space 23 in the jig 12a, the present system has the vacuum pump 17 as a pressure adjusting member (pressure adjusting means) at the outside of the pressure-applying bath 19, and a pipe 13 to link the jig 12a to the vacuum pump 17.

Like the pipe 15, the pipe 13 branches somewhere in the middle, and one of the branches is connected to the compressed-nitrogen cylinder 16 (pressure adjusting member (pressure adjusting means)) used to leak a pressure.

Figure 5:
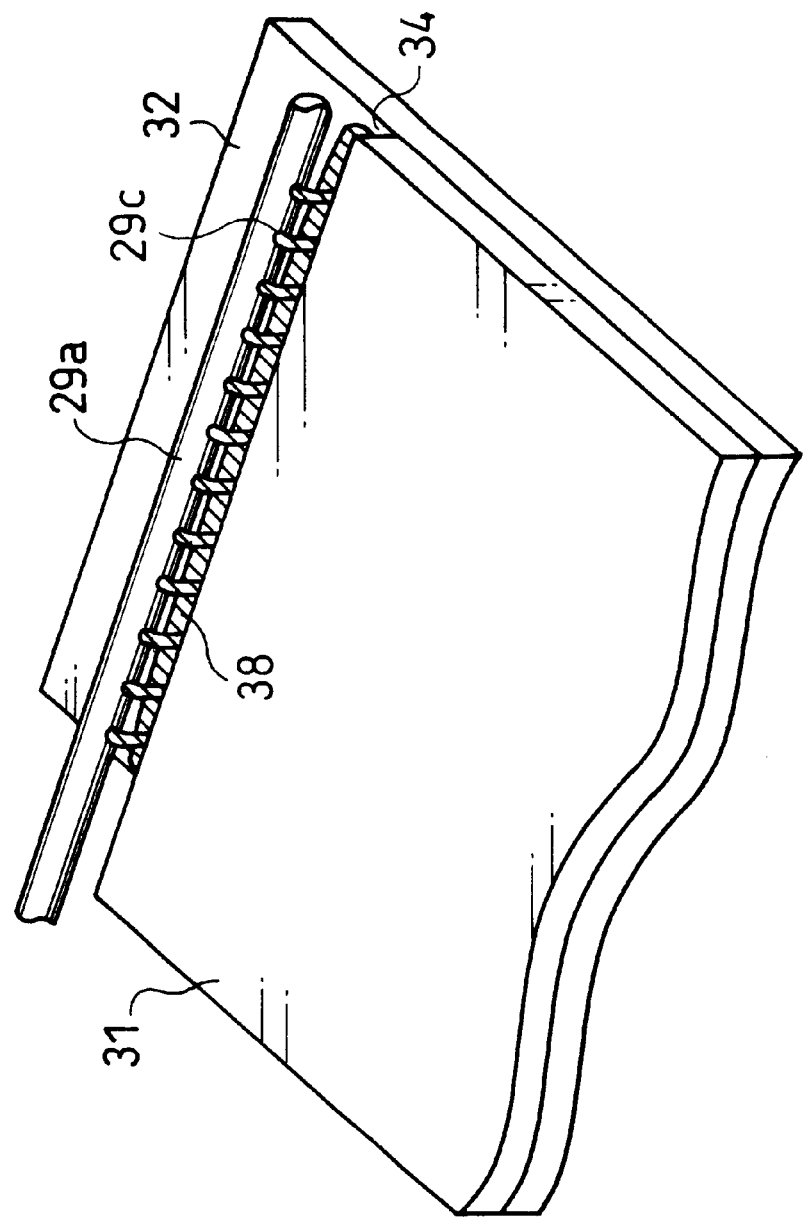
FIG. 5 is a perspective view depicting an arrangement of a liquid crystal supplying tube for supplying liquid crystal which is injected into the cell in the liquid crystal injecting device.

Also, the present system has liquid crystal supplying tubes 29a and 29b (liquid crystal supplying means) which respectively supply the liquid crystal 38 to the inlet 34 (opening in the inlet side) and the air outlet 35 (opening in the outlet side). As shown in FIG. 5, the liquid crystal supplying tube 29a is provided in parallel with the inlet 34, and a plurality of holes 29c, through which the liquid crystal 38 is released, are made through its side surface along the inlet 34. Likewise, the liquid crystal supplying tube 29b is provided in parallel with the air outlet 35, and a plurality of holes, through which the liquid crystal 38 is released, are made through its side surface along the air outlet 35.

As can be understood from FIG. 1, the liquid crystal supplying tubes 29a and 29b are provided in the jigs 12a and 12b, respectively, but this arrangement does not deteriorate the airtightness of the spaces 23 and 27.

Figure 6:
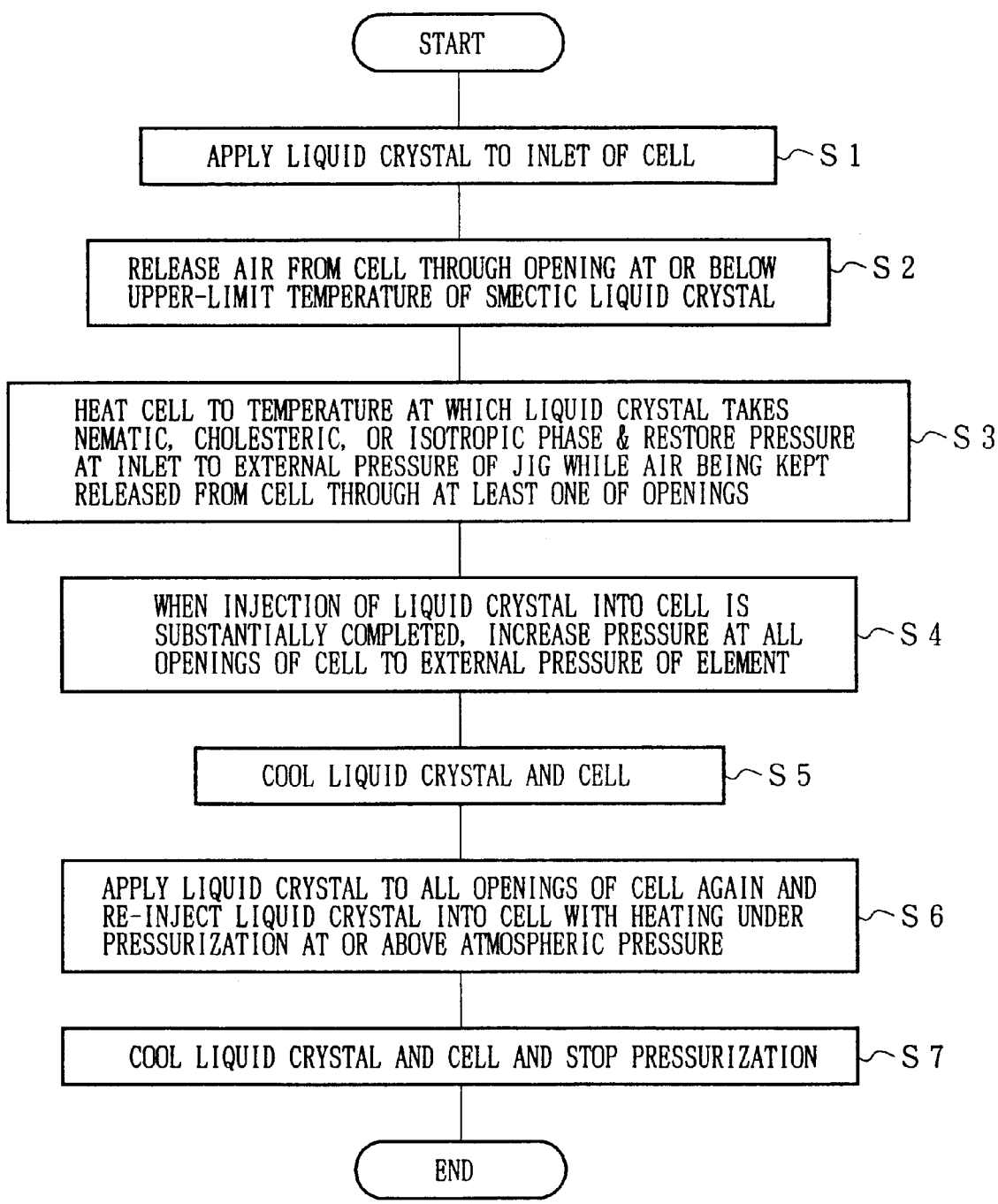
FIG. 6 is a flowchart detailing the procedure for injecting the liquid crystal into the cell in the liquid crystal injecting device.

Next, with reference to the flowchart of FIG. 6, the following will explain the procedure of injecting the liquid crystal 38 into the cell 11 by the above-arranged liquid crystal injecting system.

Initially, the liquid crystal 38, namely, ferroelectric liquid crystal herein, is applied to the vicinity of the inlet 34 of an empty cell 11 through the liquid crystal supplying tube 29b, so that it is applied in parallel with the inlet 34 (Step 1, hereinafter, Step is abbreviated to S). In the present embodiment, ferroelectric liquid crystal commercially known as SCE8 of Merck AG is used. The phase series and phase transition temperatures of SCE8 are as follows:

| (−20° C.) | (58° C.) | (78° C.) | (98° C.) | crystal—SmC*phase—SmA phase—N*phase—Iso phase, where "Iso phase" means an isotropic phase.

Subsequently, the cell 11 is placed in the liquid crystal injecting device 1 provided in the pressure-applying bath 19 as shown in FIG. 1. More specifically, the four edges of the cell 11 are sealed airtight with the jig 12a and the air outlet 35 of the cell 11 is sealed airtight dually by the jigs 12a and 12b.

Then, air in the pressure-applying bath 19 is replaced with nitrogen. More specifically, after air in the pressure-applying bath 19 is displaced to an order of some torr, nitrogen is introduced into the same from the compressed-nitrogen cylinder 20 (gas introducing means).

The reason why air inside the pressure-applying bath 19 is replaced with nitrogen is as follows. That is, when a high viscous liquid crystal material, which is difficult to inject into the cell 11 at room temperature, such as the ferroelectric liquid crystal, is used as the liquid crystal 38, the liquid crystal material has to be heated until its viscosity is reduced to a level suitable for the injection.

However, if the liquid crystal material is heated while it keeps contact with oxygen, the properties of the liquid crystal may be changed as the liquid crystal material reacts with oxygen in the air. Therefore, to prevent the deterioration of the liquid crystal material, air in the pressure-applying bath 19 is replaced with an inert gas, such as nitrogen in the liquid crystal injecting method of the present embodiment. Nitrogen is used as an example inert gas in the present embodiment, but it should be appreciated that an inter gas of other kinds can be used as well.

Next, air in the spaces 23 and 27 in the jigs 12a and 12b is released by the vacuum pumps 17 and 14, respectively.

By releasing air in the spaces 23 and 27 in the jigs 12a and 12b, a difference in pressure is produced between the interior and exterior of each of the jigs 12a and 12b. Consequently, the jigs 12a and 12b sandwich the cell 11 firmly from above and beneath, whereby an airtightly sealed area is produced at the circumference of the cell 11.

If the rigid bodies 21 and 22 of the jig 12a and the rigid bodies 25 and 26 of the jig 12b are fixed with bolts (not shown) or the like at the initial stage of the air releasing from the spaces 23 and 27 by the vacuum pumps 14 and 17, respectively, the cell 11 can be sealed airtight in the jig 12a and 12b more smoothly.

By decreasing internal pressures of the spaces 23 and 27 sealed airtight by the jigs 12a and 12b, respectively, air in the space (into which the liquid crystal 38 will be injected) between the substrates 31 and 32 forming the cell 11 can be released in the liquid crystal injecting device 1 of the present embodiment.

In the conventional liquid crystal injecting method, generally a pressure has to be decreased to an order of $10^{-2}$ torr. However, in the injecting method of the present embodiment, a pressure in the spaces 23 and 27 of the jigs 12a and 12b only has to be decreased to 1–50 torr. Consequently, the pressure reducing time can be cut shorter considerably compared with the conventional method.

Further, in the conventional injecting method using the pressure-decreasing bath, the pressure has to be reduced very slowly, so that an internal pressure of the cell does not become too high compared with an external pressure of the cell. However, according to the injecting method of the present embodiment, since an internal pressure of the cell 11 alone is reduced, the pressure reducing rate can be increased, thereby making it possible to further cut the pressure reducing time.

Figure 13:
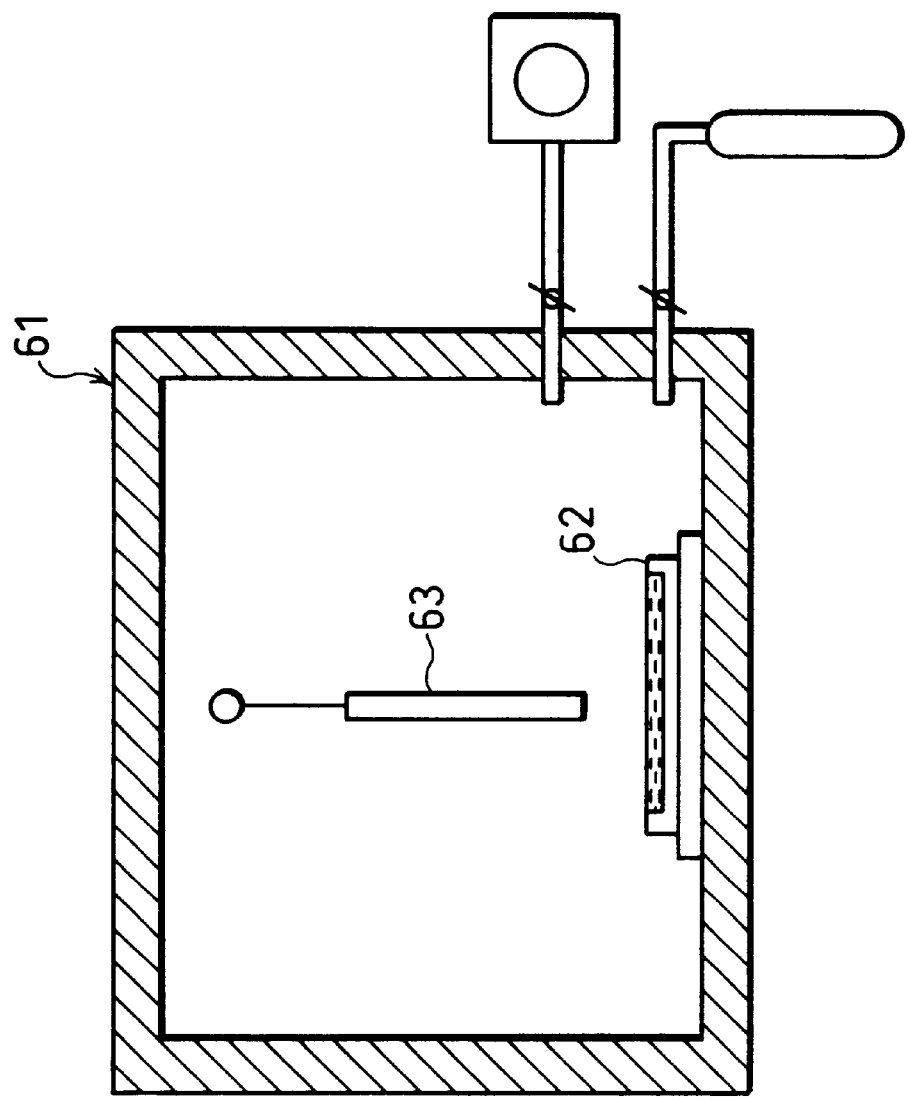
FIG. 13 is a cross section schematically showing an example arrangement of a conventional liquid crystal injecting section.
Figure 14:
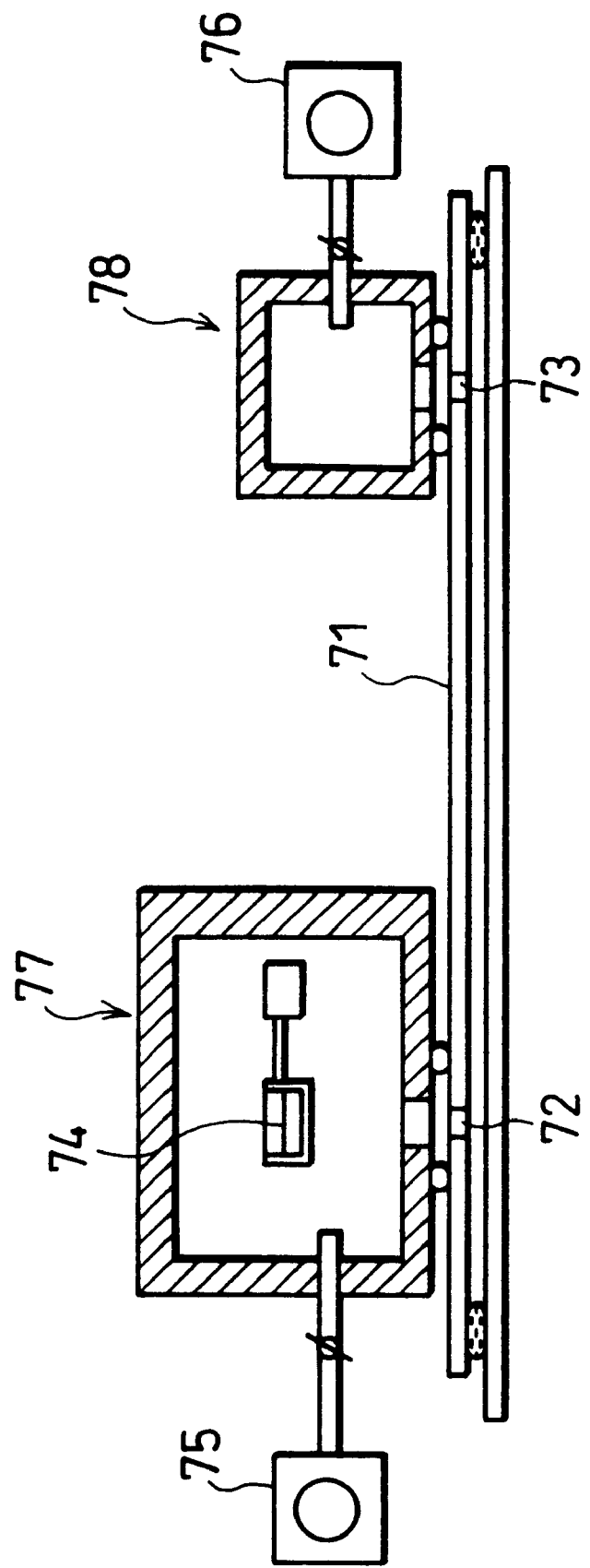
FIG. 14 is a cross section schematically showing another example arrangement of a conventional liquid crystal injecting section.

For example, in case that the liquid crystal is injected into a cell by a conventional liquid crystal injecting device of FIG. 13, it takes about 8 hours to reduce an internal pressure of a cell of 15-inch across. However, according to the injecting method of the present embodiment, since an internal pressure of the cell 11 alone is reduced, the pressure reducing time can be cut by a few hours.

When air releasing is completed, the cell 11 and the liquid crystal material on the cell 11 are heated by the hot plate 10. Here, since the hot plate 10 has the aforementioned protrusion portion 10b to heat the substrates 31 and 32 forming the cell 11 in such a manner that a change in their respective in-plane temperatures is substantially even, the entire cell 11 can be heated evenly.

Under these conditions, a temperature of the cell 11 is set anywhere between room temperature and the upperlimit temperature for the liquid crystal 38 to remain in the smectic phase (in case of SCE8, 78° C. or below), and air in the cell 11 is kept released for a certain time (S2). According to this method, since a pressure is kept reduced with heating, vapors or a non-polymerized monomer contained in the cell 11 can be removed in a satisfactory manner.

When the temperature of the cell 11 is set to a temperature at which the liquid crystal 38 remains in any of the nematic, cholesteric and isotropic phases, the liquid crystal 38 becomes so fluid that it flows into the cell 11 from the liquid crystal supplying tube 29a during the deairing step, that is, before air is released from the cell 11 satisfactory, and the unreleased air remains in the form of bubbles in the cell 11 into which the liquid crystal 38 has been injected. For this reason, to release air from the cell 11 in a satisfactory manner, it is necessary to set the temperature of the cell 11 to the upper-limit of the smectic phase of the liquid crystal 38 or below to impart adequate viscosity to the liquid crystal 38. In addition, by raising a temperature of the cell 11 to 100° C. while the air in the cell 11 is being released, a non-polymerized monomer of a high molecular film and moisture absorbed in the color filters formed over the substrates 31 and 32 forming the cell 11 are readily vaporized. Thus, by setting the air-releasing time for the cell 11 adequately, a vaporized monomer or vapors can be removed completely. In short, deairing can be carried out. Consequently, the occurrence of the cavitation in the resulting liquid crystal element can be prevented. In the present embodiment, a temperature of the cell 11 is raised to 100° C., and lowered to 80° C. later, and deairing of the cell 11 is carried out for 6 hours.

Moreover, since the liquid crystal 38 is applied to the vicinity of the inlet 34 in S1, the applied liquid crystal 38 becomes less viscous with heating, and closes the inlet 34 eventually. Thus, the liquid crystal 38 is supplied (injected) later through the inlet 34 under the condition where air in the cell 11 has been released in a satisfactory manner. Consequently, the liquid crystal 38 of exactly a necessary amount needs to be supplied, thereby preventing exceeding supply of the liquid crystal 38. Also, since the injecting time of the liquid crystal 38 can be cut shorter, the heating time of the liquid crystal 38 during the injection can be also cut shorter. Consequently, the deterioration of the liquid crystal 38 by heat can be curbed. Further, since the liquid crystal 38 is injected into the cell 11 after the air in the cell 11 is released in a satisfactory manner, the cell 11 and liquid crystal 38 can be deaired simultaneously. In other words, deairing of the cell 11 and liquid crystal 38 does not have to be carried out in different steps (separate vessels).

Next, the cell 11 is heated to a temperature at which the ferroelectric liquid crystal takes one of the nematic, cholesteric, and isotropic phases, and the ferroelectric liquid crystal is supplied further to the inlet 34 of the cell 11 through the liquid crystal supplying tube 29a. Meanwhile, a nitrogen gas is introduced into the space 23 in the jig 12a to raise a pressure at the inlet 34 of the cell 11 (S3).

In other words, after the inlet 34 is closed completely with the ferroelectric liquid crystal supplied through the liquid crystal supplying tube 29a, the vacuum pump 17 is stopped, and a nitrogen gas is introduced into the space 23 in the jig 12a from the compressed-nitrogen cylinder 16 until an internal pressure of the space 23 in the jig 12a is increased as high as an external pressure of the jig 12a, that is, an internal pressure of the pressure-applying bath 19.

In the present embodiment, since the liquid crystal injecting device 1 is enclosed in the pressure-applying bath 19 capable of increasing and decreasing its internal pressure, the entire cell 11 is enclosed in a space having a pressure above atmospheric pressure. Consequently, an internal pressure of the space 23 can be increased to atmospheric pressure or above (for example, about 2000 torr). In this case, the injecting rate of the liquid crystal 38 can be increased further. If an internal pressure of the pressure-applying bath 19 is increased as high as or higher than an internal pressure of the space 23 by the compressed-nitrogen cylinder 20, the separation of the substrates 31 and 32 (liquid crystal element) forming the cell 11 can be prevented.

Here, it should be noted that, while the pressure is being increased, the vacuum pump 14 connected to the jig 12b is kept activated, so that air is kept released through the air outlet 35 of the cell 11.

Consequently, a difference in pressure is produced between the inlet 34 and air outlet 35 of the cell 11, and the ferroelectric liquid crystal (liquid crystal 38) supplied in the vicinity of the inlet 34 is injected smoothly through the inlet 34 toward the air outlet 35.

In the present embodiment, the liquid crystal 38 is applied to the vicinity of the inlet 34 of the cell 11 and the cell 11 is placed in the liquid crystal injecting device 1 in Si, and air in the cell 11 is released in S2. However, it should be appreciated that, without experimental confirmation, in case that means for deairing the liquid crystal 38 separately and injecting the liquid crystal 38 in parallel with the inlet 34 is provided, there will be no problem if S1 is carried out during or after S2 or during or after the heating step of S3.

Subsequently, the liquid crystal 38 is kept injected in the state of S3 until it substantially fills a space between the substrates 31 and 32 of the cell 11. Then, the vacuum pump 14 is stopped and a nitrogen gas is supplied to the jig 12b from the compressed-nitrogen cylinder 18, so that an internal pressure of the space 27 in the jig 12b is raised as high as internal pressures of the jig 12a and pressure-applying bath 19 (S4).

Then, while an internal pressure of the jig 12b and those of the jig 12a and pressure-applying bath 19 are maintained at the same level, the cell 11 is kept heated by the hot plate 10 for about 1 hour. Consequently, the cell 11 is fully filled with the liquid crystal 38. Here, since the entire cell 11 is heated evenly on the hot plate 10, the injecting rate of the liquid crystal 38 is increased, and as a consequence, it becomes possible to cut the injecting time of the liquid crystal 38 shorter and prevent deficient injection.

Figure 8:
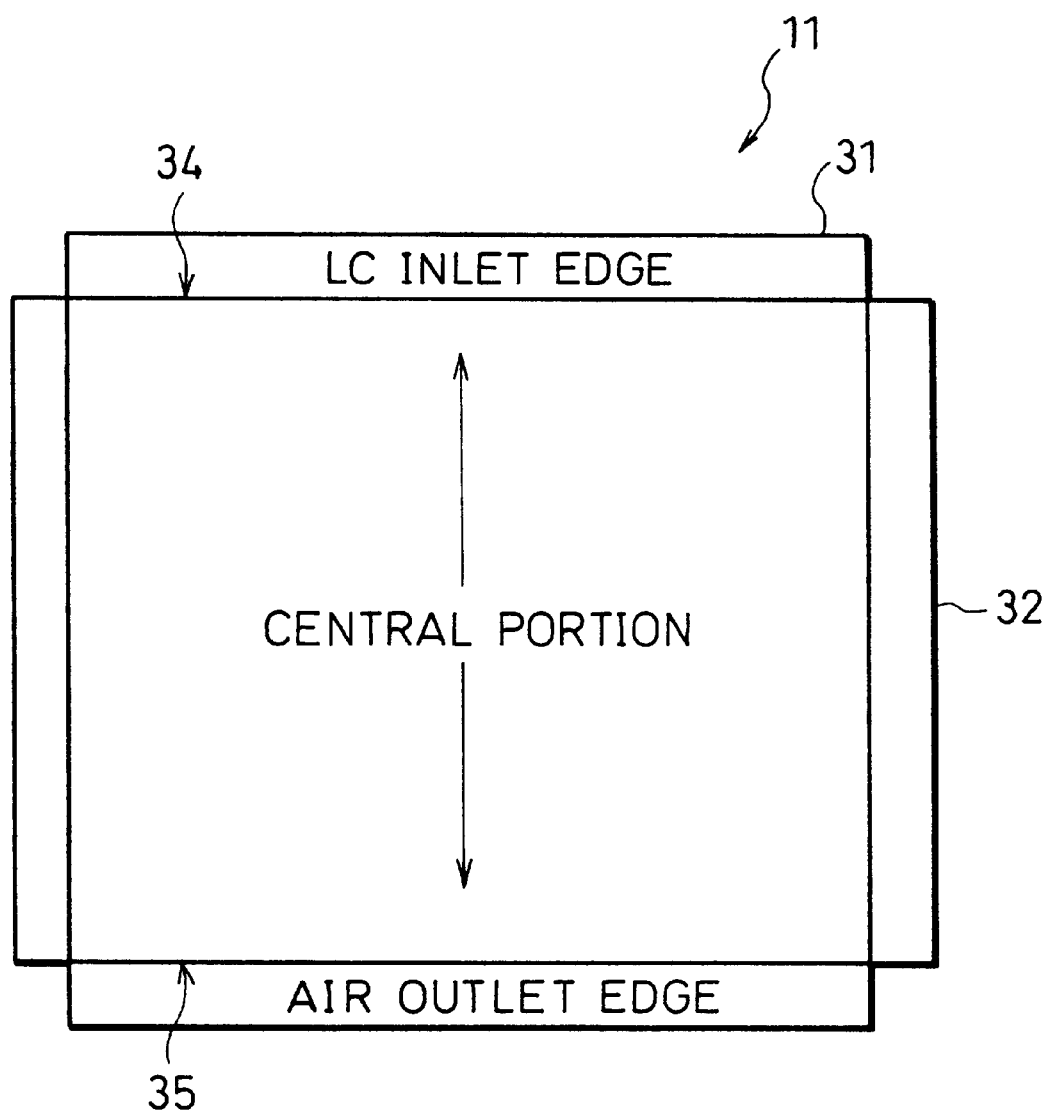
FIG. 8 is a view schematically explaining how the cell is cooled.

Next, the cooling step of the cell 11 and the liquid crystal 38 injected therein is carried out (S5). As shown in FIG. 8, it is preferable to cool the cell 11 and liquid crystal 38 gradually at a rate of 5° C./min. or a slower rate from the center of the substrates 31 and 32 forming the cell 11 toward the inlet 34 and air outlet 35. By cooling the cell 11 and liquid crystal 38 in such a manner as to give a gradient to an inplane-temperature of the cell 11, a filling rate of the liquid crystal 38 can be improved, and an empty area without the liquid crystal 38, that is, deficient injection of the cell 11, can be eliminated from the resulting liquid crystal element. In addition, the liquid crystal 38 can be align ed in a satisfactory manner by such cooling.

To realize such cooling (gradual cooling), as previously mentioned with reference to FIG. 1, the hot plate 10 is provided with the tubing 10c (heating and cooling source), throughout which a nitrogen gas or vapor circulates. In the present embodiment, the liquid crystal 38 is cooled to 40° C. over 8 hours from a temperature at the injection.

However, by the above method alone, a proceeding rate of the liquid crystal 38, which has been injected through the inlet 34 and flows into a space between the substrates 31 and 32, is eventually reduced as its top end approaches to the air outlet 35, and an overall injecting time of the liquid crystal 38 takes long after all. Thus, as shown in FIGS. 7(a) and 7(c), unfilled areas are readily produced in the vicinity of the air outlet 35 (for example, a portion Y). Further, when the liquid crystal element is produced by cooling the cell 11 filled with the liquid crystal 38 in S4, as shown in FIGS. 7(a) and 7(b), cavitation C having no liquid crystal 38 is produced at an indefinite portion X in the resulting liquid crystal element (that is, in the cell 11 filled with the liquid crystal 38) due to the volume loss (contraction) of the liquid crystal 38.

To eliminate this problem, in the liquid crystal injecting method of the present embodiment, all the openings of the cell 11 withholding the liquid crystal 38 inside, namely the inlet 34 and air outlet 35, are applied with the liquid crystal 38 and the liquid crystal 38 is re-injected into the cell 11 through the liquid crystal supplying tubes 29a and 29b at room temperature or above under atmospheric pressure or above (S6). If the liquid crystal 38 is in the highly-fluid nematic, cholesteric, or isotropic phase, the liquid crystal 38 can be readily re-injected into the cell 11. Herein, the pressure is set to 5 atmospheric pressure, and the liquid crystal 38 is re-injected for 30 minutes in the isotropic phase, 30 minutes in the cholesteric phase, 1 hour in the smectic A phase, and 1 hour in the smectic C* phase.

In the present procedure, the cell 11 filled with the liquid crystal 38 is cooled to room temperature in S5, and the liquid crystal 38 is re-injected in S6 at room temperature or above under atmospheric pressure or above. However, it should be appreciated that, without experimental confirmation, the cooling step to room temperature in S5 can be omitted.

Then, after the liquid crystal 38 is re-injected into the cell 11, the cell 11 is cooled to room temperature, after which the pressure applying state is released (S7).

The injection of the liquid crystal 38 into the cell 11 is completed by the above-explained steps. In short, a liquid crystal element is obtained.

By following the above steps, an affinity between the surfaces of the substrates 31 and 32 forming the cell 11 and the liquid crystal 38 can be upgraded, and therefore, it has become possible to eliminate deficient injection, such as formation of bubbles caused by the volume loss of the liquid crystal 38.

The liquid crystal injecting method of the present embodiment is adopted for a cell 11 which is filled with the ferroelectric liquid crystal and measures 17 inches from the upper left corner to the lower right corner with a cell gap of 1.5 µm (gap between the substrates 31 and 32). Then, it takes 6 hours to deair the interior of the cell 11, 2 hours to heat the cell 11, 6 hours to inject the liquid crystal 38 into the cell 11, 8 hours to cool the cell 11 filled with the liquid crystal 38, and 6 hours to re-inject the liquid crystal 38. Consequently, a satisfactory liquid crystal element having no deficient injection, bubbles, and cavitation is obtained.

Comparative Example 1

Into an empty cell 11, measuring 17 inches from the upper left corner to the lower right corner with a cell gap of 1.5 µm, ferroelectric liquid crystal is injected by the conventional method using the liquid crystal injecting device shown in FIG. 13. Then, it takes about 8 hours to reduce the pressure, 3.5 hours to heat the cell 11, about 16 hours to inject the liquid crystal 38 into the cell 11, and 8 hours to cool the cell 11 filled with the liquid crystal 38. Consequently, the resulting liquid crystal element causes deficient injection especially at the opposing side to the inlet 34, and the bubbles and cavitation all over.

Comparative Example 2

Into an empty cell 11, measuring 17 inches from the upper left corner to the lower right corner with a cell gap of 1.5 µm, ferroelectric liquid crystal is injected by the method of the above embodiment by omitting the steps of desiring of the cell 11 and re-injection of the liquid crystal 38. Then, it takes 30 minutes to reduce a pressure, 3.5 hours to heat the cell 11, about 11 hours to inject the liquid crystal 38 into the cell 11, and 8 hours to cool the cell 11 filled with the liquid crystal 38. Consequently, some of the resulting liquid crystal elements cause deficient injection at the opposing side to the inlet 34, and all the resulting liquid crystal elements have the bubbles and cavitation all over.

Comparative Example 3

Into an empty cell 11, measuring 17 inches from the upper left corner to the lower right corner with a cell gap of 1.5 µm, ferroelectric liquid crystal is injected by the method of the above embodiment by omitting the step of desiring of the cell 11. Then, it takes 30 minutes to reduce a pressure, 3.5 hours to heat the cell 11, 8 hours to inject the liquid crystal 38 into the cell 11, 8 hours to cool the cell 11 filled with the liquid crystal 38, and 6 hours to re-inject the liquid crystal 38. Consequently, bubbles produced in the cell 11 can not be eliminated completely.

Comparative Example 4

Into an empty cell 11, measuring 17 inches from the upper left corner to the lower right corner with a cell gap of 1.5 µm, ferroelectric liquid crystal is injected by the method of the above embodiment by omitting the step of re-injecting the liquid crystal 38. Then, it takes 6 hours to deair the cell 11, 2 hours to heat the cell 11, 11 hours to inject the liquid crystal 38 into the cell 11, and 8 hours to cool the cell 11 filled with the liquid crystal 38. Consequently, some of the resulting liquid crystal elements cause deficient injection at the opposing side to the inlet 34, and all the resulting liquid crystal elements have the bubbles and cavitation all over.

Comparative Example 5

Into an empty cell 11, measuring 17 inches from the upper left corner to the lower right corner with a cell gap of 1.5 µm, ferroelectric liquid crystal is injected by the method of the above embodiment except that the cell 11 is deaired at room temperature. Then, it takes 12 hours to deair the cell 11, and 6 hours to heat the cell 11. Consequently, bubbles produced in the cell 11 can not be eliminated completely.

As has been explained, according the liquid crystal injecting system of the present embodiment, since four edges of the cell 11 are sandwiched firmly from above and beneath by the rigid bodies 21 and 22 of the jig 12a, warps of the substrates 31 and 32 during the liquid crystal injecting step can be prevented.

Further, by injecting the liquid crystal 38 into the cell 11 after reducing an internal pressure of the cell 11 alone, the occurrence of warps of the substrates 31 and 32 caused by a negative pressure can be suppressed compared with the method of injecting the liquid crystal 38 into the cell 11 by placing the entire cell 11 in the pressure-reducing bath.

As previously mentioned, since the rigid body 21 of the jig 12a has the rectangular opening 12c at the center, if a viewing window 19a made of glass or the like is provided at the top of the pressure-applying bath 19, there is offered another advantage that the liquid crystal injecting state can be monitored (visually observed) above the liquid crystal injecting device 1. In this case, one can visually check at least a part of the cell 11 from the outside while the cell 11 is attached to the liquid crystal injecting device 1, and therefore, he can judge an occurrence of error or the like appropriately when the injection of the liquid crystal 38 is completed. Consequently, the liquid crystal 38 can be injected in a reliable manner.

It is preferable to place a black hot plate 10 below the opening 12c of the rigid bodies 21 and 22, because the injection state of the liquid crystal 38 can be checked more readily.

Also, the injection state of the liquid crystal 38 can be checked more readily by using a hot plate 10 made of a light-transmitting material, such as fused quartz, and irradiating polarized light from either side of the cell 11.

In the conventional method, a pressure is adjusted in accordance with the progress of the injection. However, in the present embodiment, a pressure is kept constant throughout the injecting procedure.

Further, by re-injecting the liquid crystal 38 into the cell 11, formation of unfilled areas or cavitation can be eliminated, thereby making it possible to obtain a satisfactory cell 11.

Thus, compared with the conventional liquid crystal injecting method, a more satisfactory cell 11 can be obtained by the present liquid crystal injecting method.

The liquid crystal injecting device 1 of the present embodiment can be modified in the following manner while maintaining the same effect.

Figure 9:
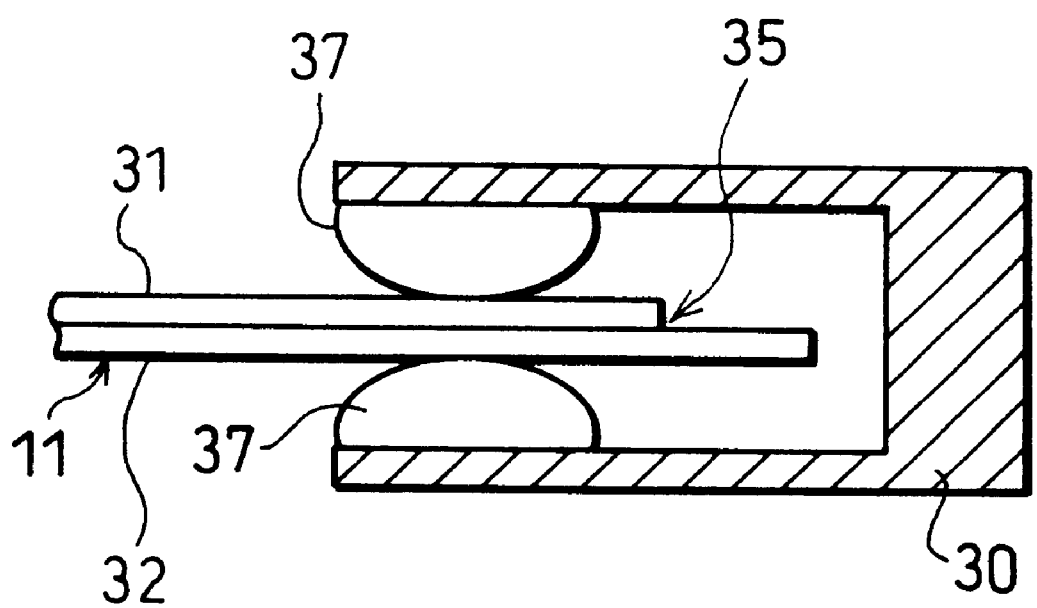
FIG. 9 is a cross section showing an example modification of the liquid crystal injecting section.

In the liquid crystal injecting device 1, an edge of the cell 11 used as the air outlet 35 is sealed airtight by the jig 12b, but this arrangement can be modified as shown in FIG. 9. More specifically, instead of using the jig 12b, the air outlet 35 of the cell 11 may be sealed airtight by a U-shaped rigid body 30 producing a space which surrounds the edge used as the air outlet 35, and two balloons 37 (elastic bodies) sandwiching the edge used as the air outlet 35 from above and beneath at the opening of the rigid body 30. The balloons 37 are made of silicon rubber, for example, and an internal pressure thereof is adjustable.

In this case, the rigid body 30 and each of the substrates 31 and 32 are spaced apart by some millimeters. The elastic and airtight balloons 37 are placed so as to fill a space between the substrates 31 and 32 and the rigid body 30, and expanded by increasing internal pressures thereof, whereby an edge of the cell 11 used as the air outlet 35 is sealed airtight. Consequently, a minor discrepancy in size between the substrates 31 and 32 can be compensated, and a space isolated from the external can be readily produced.

Alternatively, an elastic and highly-airtight film may be used instead of the rigid body 30, and an adhesive tape may be used instead of the balloons 37.

Further, the jigs 12*a* and 12*b* are not necessarily used together, and may be used to seal the inlet 34 and air outlet 35, respectively.

Embodiment 2

Figure 10:
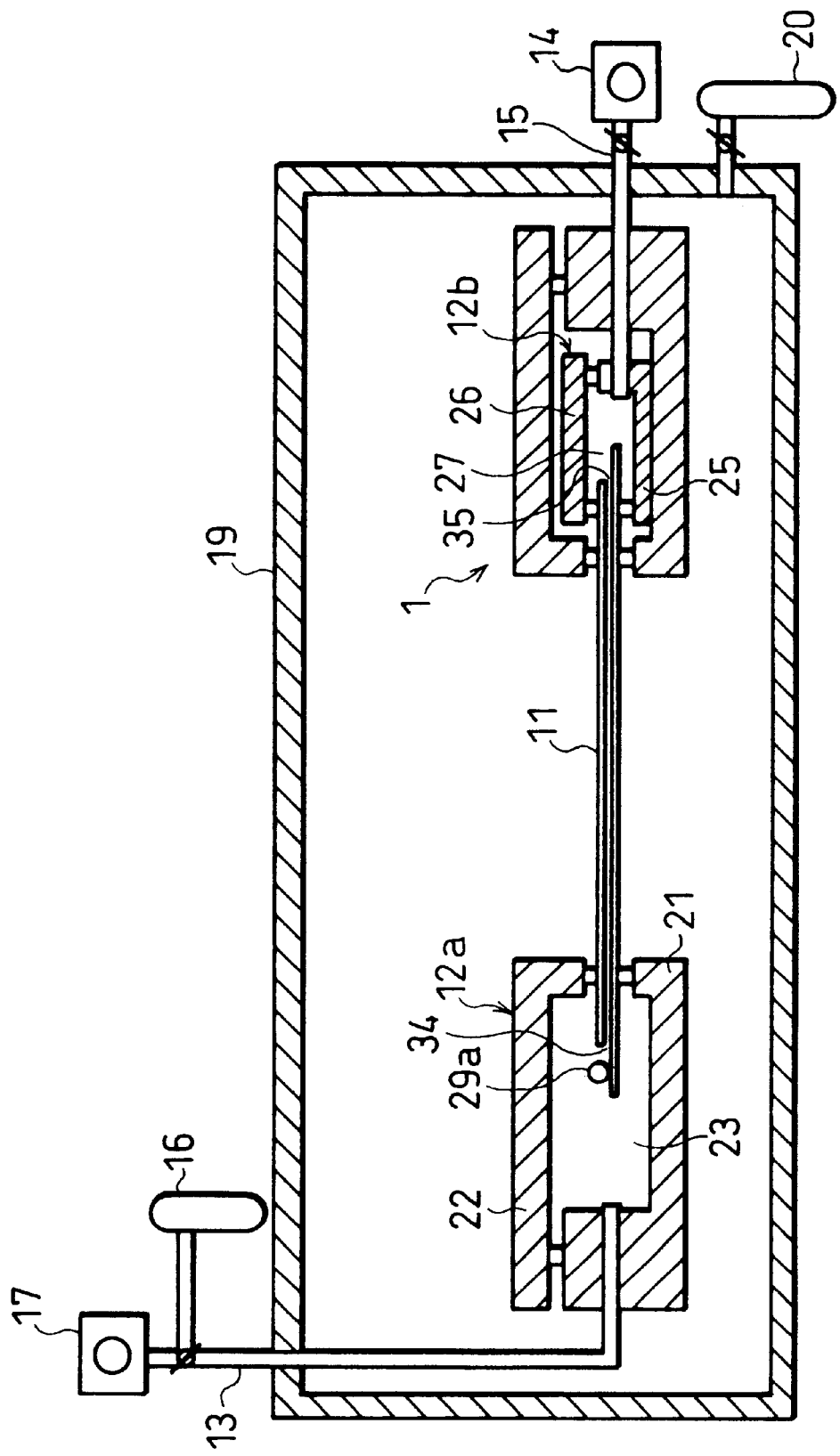
FIG. 10 is a cross section showing an arrangement of a liquid crystal injecting device in accordance with another example embodiment of the present invention.

Referring to FIG. 10, the following description will describe another example embodiment of the present invention. Hereinafter, like components are labeled with like reference numerals with respect to Embodiment 1, and the description of these components is not repeated for ease of explanation.

In the present embodiment, a liquid crystal injecting system (liquid crystal injecting device) shown in FIG. 10 is used to inject the liquid crystal 38 into the cell 11. The present system is suitable for injecting a liquid crystal material which has relatively low viscosity and can be injected into a cell at room temperature.

As shown in FIG. 10, the liquid crystal injecting system of the present embodiment is identical with its counterpart of Embodiment 1 except that the compressed-nitrogen cylinder 18 which supplies nitrogen to the space 27 in the jig 12*b*, the hot plate 10, and the liquid crystal supplying tube 29*b* which supplies the liquid crystal to the air outlet 35 are omitted.

The liquid crystal injecting procedure of the present system is as follows. Initially, like in Embodiment 1, the cell 11 is placed in the jigs 12*a* and 12*b* of the liquid crystal injecting device 1 (liquid crystal injecting section), and air in the spaces 23 and 27 in the jigs 12*a* and 12*b* are released by the vacuum pumps 17 and 14, respectively.

Consequently, air in a space between the substrates 31 and 32 forming the cell 11 is released through both the inlet 34 and air outlet 35 of the cell 11 until a pressure in the space between the substrates 31 and 32 forming the cell 11 is reduced to 1–50 torr.

Then, a temperature of the cell 11 is raised to 100° C., after which the cell 11 is let stand at 80° C. for 6 hours. Then, a residual gas in the cell 11 is released in 1 minute, after which the cell 11 is cooled gradually to room temperature. By gradually cooling the cell 11, the liquid crystal 38 is aligned orderly. If the cell 11 is cooled rapidly, the alignment of the liquid crystal 38 is disturbed.

Then, the liquid crystal 38 is supplied along the inlet 34 of the cell 11 through the liquid crystal supplying tube 29*a*. After the interior and exterior of the cell 11 is isolated by the liquid crystal 38 fully filling the inlet 34, the vacuum pump 17 is stopped, and nitrogen is supplied to the jig 12*a* from the compressed-nitrogen cylinder 16 until an internal pressure of the space 23 of the jig 12*a* is raised to about 2000 torr from atmospheric pressure. Here, by increasing an internal pressure of the liquid crystal injecting device 1 as high as or higher than an internal pressure of the space 23 by the compressed-nitrogen cylinder 20 (gas introducing means), the separation of the substrates 31 and 32 (liquid crystal element substrates) forming the cell 11 can be prevented.

While an internal pressure of the jig 12*a* is being increased, the vacuum pump 14 on the jig 12*b*'s end is activated continuously, so that air in the cell 11 is kept released through the air outlet 35.

Consequently, a difference in pressure is produced between the inlet 34 and air outlet 35 of the cell 11, whereby the liquid crystal 38 supplied to the inlet 34 starts to flow toward the air outlet 35, and is injected into a space between the substrates 31 and 32 forming the cell 11.

When the cell 11 is fully filled with liquid crystal 38, in other words, when the liquid crystal 38 fills a space between the substrates 31 and 32 forming the cell 11 completely, the vacuum pump 14 is stopped while the jig 12*b* is opened, whereby an internal pressure of the jig 12*b* is dropped as low as an internal pressure of the jig 12*a*.

Further, the pressure-applying bath 19 and jigs 12*a* and 12*b* are opened, so that an internal pressure of each is restored to atmospheric pressure.

The injection of the liquid crystal into the cell 11 is completed by the above steps.

According to the arrangement and injecting method of the present embodiment, in case that a liquid crystal material has a relatively low viscosity and can be injected at room temperature, the liquid crystal can be injected efficiently by being supplied to the inlet 34 of the cell 11 after air has been released from the cell 11.

Embodiment 3

Figure 11:
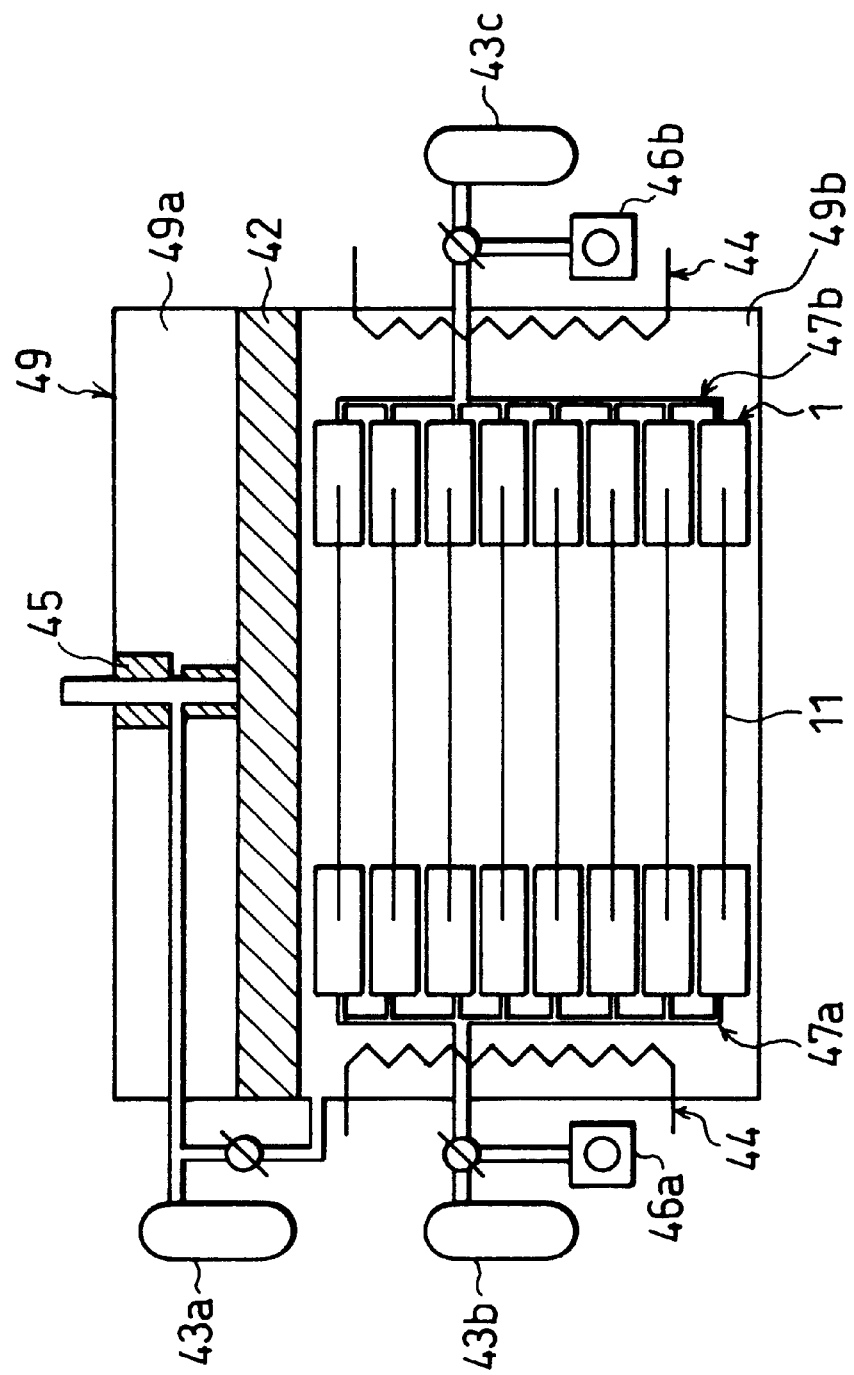
FIG. 11 is a cross section showing an arrangement of a liquid crystal injecting device in accordance with still another example embodiment of the present invention.
Figure 12:
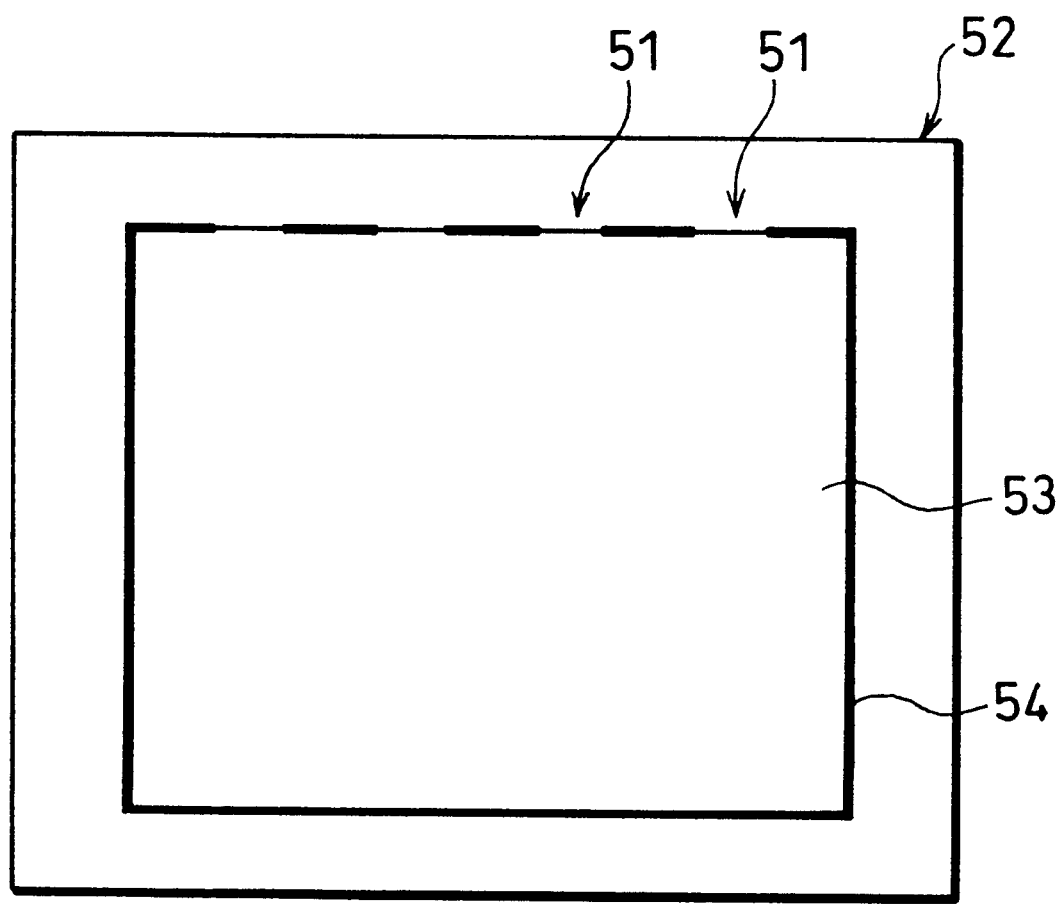
FIG. 12 is a plan view showing a sealing pattern of a conventional liquid crystal element.

Referring to FIG. 11, the following description will describe still another example embodiment of the present invention. Hereinafter, like components are labeled with like reference numerals with respect to Embodiments 1 and 2, and the description of these components is not repeated for ease of explanation.

As shown in FIG. 11, in a liquid crystal injecting system (liquid crystal injecting device) of the present embodiment, a pressure-applying bath 49 (airtight bath), serving as a vessel capable of increasing and decreasing its internal pressure, is partitioned to two bathes 49*a* and 49*b* by a flexible plate 42 (pressing means). In the present liquid crystal injecting system, a pressure adjusting mechanism 43a is provided to each of the bathes 49*a* and 49*b* to reduce their respective internal pressures.

Also, two heaters 44 are provided to the bath 49*b* to heat the interior thereof.

To inject the liquid crystal 38 into the cell 11 using the above liquid crystal injecting system, the liquid crystal devices 1 as the liquid crystal injecting section, each having the cell 11, are layered in the bath 49*b*.

The liquid crystal injecting device 1 thus placed are interconnected to each other through pipes 47*a* and 47*b*, which are connected to gas supplying cylinders 43*b* and 43*c* and air-releasing pumps 46*a* and 46*b*, respectively. In the present embodiment, by placing a plurality of liquid crystal injecting devices 1 in the bath 49*b* in the above manner, the liquid crystal 38 can be injected into a plurality of cells 11 simultaneously, thereby making it possible to improve production efficiency of the liquid crystal element.

As was explained in Embodiment 1, each liquid crystal injecting device 1 is arranged in such a manner that four edges of the cell 11 is sealed airtight by the jig 12*a* while one of the edges used as the air outlet 35 is sealed airtight dually by the jigs 12*a* and 12*b*.

Also, the pipes 47*a* and 47*b* are provided to the liquid crystal injecting devices 1 in such a manner as to release air from the spaces 23 and 27 in the jigs 12*a* and 12*b* in each.

Next, air in the bath 49*b*, in which the liquid crystal injecting devices 1 are placed, is replaced with nitrogen.

Further, a gas is supplied from the pressure adjusting mechanism 43a, so that a pressure in the pressure-applying device 45 is increased, whereby the plate 42 is moved toward the bath 49b. Consequently, the plate 42 is pressed against the layered liquid crystal injecting devices 1, whereby the liquid crystal injecting devices 1 are fixed.

Then, in each of the liquid crystal injecting devices 1, air in the spaces 23 and 27 in the jigs 12a and 12b is released by releasing pumps 46a and 46b (pressure adjusting members (pressure adjusting means)). In short, air in a space between the substrates 31 and 32 forming the cell 11 is released from the inlet 34 and air outlet 35 of the cell 11.

When air releasing has been completed, the bath 49b is heated by the two heaters 44, whereupon the injection of the liquid crystal 38 to the cell 11 in each liquid crystal injecting device 1 starts.

After the inlet 34 of the cell 11 is closed completely with the liquid crystal 38, a nitrogen gas is supplied to the space 23 in the jig 12a by the gas supplying cylinder 43c (pressure adjusting member (pressure adjusting means)), and a pressure at the inlet 34 of the cell 11 is restored to a level as high as an internal pressure of the bath 49b, during which air is kept released through the air outlet 35 of the cell 11.

As has been explained, according to the liquid crystal injecting system of the present embodiment, the liquid crystal 38 can be injected into a plurality of the cells 11 simultaneously.

Also, by pressing the plate 42 against the layered liquid crystal injecting devices 1, the layered liquid crystal injecting devices 1 can be fixed as a whole, and a trouble of fixing the liquid crystal injecting devices 1 individually can be eliminated.

Note that Embodiments 1 through 3 above are given for purposes of explanation alone, and not intended to limit the present invention. Hence, it should be appreciated that the present invention can be modified in various manners within the scope of the invention. For example, the wall spacers 33 are formed in stripes in the above explanations, but column spacers 33 may be provided continuously along a direction in which the liquid crystal is injected. Further, the liquid crystal injecting device, liquid crystal injecting system, and liquid crystal injecting method explained above can be applied to liquid crystal elements using spacer beads.

Of all the above-mentioned example arrangements, the most preferred is the wall or column spacers 33 in stripes, because the liquid crystal 38 injected into the cell 11 through the inlet 34 proceeds toward the air outlet 35 along the wall or column spacers 33 smoothly, thereby cutting the time required to inject the liquid crystal 38 into the cell 11 shorter. In addition, when the wall or column spacers 33 are used as has been explained above, the substrates 31 and 32 (liquid crystal element substrate) forming the cell 11 are stronger than those in a case using fine particle spacers, namely spacer beads. Thus, there is offered an advantage that the substrates 31 and 32 are not readily separated from each other when the liquid crystal 38 is injected into the cell 11. Consequently, compared with the conventional case, the liquid crystal 38 can be injected into the cell 11 in a shorter time without causing deficient injection or giving damages to the substrates 31 and 32 forming the cell 11.

Also, liquid crystal materials used as the liquid crystal 38 are not especially limited. For example, various kinds of liquid crystal, including ferroelectric liquid crystal, anti-ferroelectric liquid crystal, nematic liquid crystal, and phase transition type Guest-Host liquid crystal, etc. are available.

Of all these examples, the ferroelectric and anti-ferroelectric liquid crystal are particularly preferable. By adopting the liquid crystal injecting method of the present invention, residual bubbles or cavitation can be eliminated from the resulting liquid crystal element having the liquid crystal 38, thereby making it possible to upgrade the display quality.

The hot plate 10 is provided to the pressure-applying bath 19 in Embodiments 1 through 3, but the hot plate 10 (heating and cooling source) may be provided to the liquid crystal injecting device 1. For example, the jig 12a and hot plate 10 may be formed as an integral unit.

Further, two openings are provided to the cell 11 in Embodiments 1 through 3, but the number of the openings is not especially limited.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A manufacturing method of a liquid crystal element by injecting liquid crystal into a cell composed of a pair of opposing substrates, at least one of which transmitting light, and provided with at least two openings, said method comprising:

a liquid crystal applying step of applying liquid crystal to at least one of the openings and a vicinity thereof;

a cell's internal pressure reducing step of releasing air from an interior of said cell through at least one of the openings to lower an internal pressure of said cell than an external pressure thereof;

a cell temperature setting step of setting a temperature of said cell to a temperature at which the liquid crystal to be injected therein takes one of a nematic, cholesteric, and isotropic phase;

a liquid crystal injecting step of injecting the liquid crystal into said cell through the opening to which the liquid crystal has been applied while air being kept released from said cell;

a liquid crystal re-injecting step of applying the liquid crystal to all the openings of said cell, and re-injecting the liquid crystal through all the openings at room temperature or above under atmospheric pressure or below; and a cell cooling step of cooling said cell to room temperature after the liquid crystal has been re-injected into said cell.

2. The manufacturing method of claim 1, wherein, in said cell's internal pressure reducing step, an internal temperature of said cell is raised to 100° C. at least once when releasing air from the interior of said cell.

3. The manufacturing method of claim 1, wherein, in said cell's internal pressure reducing step, an internal temperature of said cell is set to a range between room temperature and an upper limit temperature of a smectic phase of the liquid crystal both inclusive when releasing air from the interior of said cell.

4. The manufacturing method of claim 1, wherein, in said liquid crystal injecting step, a pressure at the opening, to which the liquid crystal has been applied, is set at or above a pressure at the opening through which air is released from said cell and at or below the external pressure of said cell.

5. The manufacturing method of claim 1, wherein said steps are performed in order of description.

6. The manufacturing method of claim 1, wherein said liquid crystal applying step is performed before said liquid crystal injecting step.

7. The manufacturing method of claim 1, wherein said liquid crystal applying step is performed after air-releasing from the internal of said cell is completed in said cell's internal pressure reducing step.

8. The manufacturing method of claim 1, wherein said liquid crystal injecting step includes a sub-step of, after said cell is filled with the liquid crystal, stopping air-releasing from the internal of said cell, and heating said cell for a predetermined period while keeping the pressure at the openings and the external pressure of said cell equal.

9. The manufacturing method of claim 1, further comprising another cell cooling step of cooling said cell to room temperature after said liquid crystal injecting step and before said liquid crystal re-injecting step.

10. The manufacturing method of claim 9, wherein, in said another cell cooling step, said cell is cooled in such a manner as to give a gradient to an in-plane temperature of the substrates of said cell.

11. The manufacturing method of claim 10, wherein said cell is cooled gradually from a central portion to a peripheral portion of the substrates of said cell.

12. The manufacturing method of claim 1, wherein one of ferroelectric liquid crystal and anti-ferroelectric liquid crystal is used as the liquid crystal.

13. The manufacturing method of claim 1, wherein:
a liquid crystal filling area in said cell is square; and
one of four edges of said cell is provided with one of the openings, so that the liquid crystal is injected therethrough, another edge opposing said edge is provided with another one of the openings, so that air is released therethrough, and rest of the four edges are not provided with any opening.

14. The manufacturing method of claim 13, wherein the opening for air-releasing and the opening for liquid crystal injection are provided to their respective edges for a substantially full width.

15. The manufacturing method of claim 1, further comprising a step of forming one of wall spacers and column spacers in stripes in said cell.

16. The manufacturing method of claim 15, wherein said spacers are formed perpendicular to the edges of said cell provided with the openings.

* * * * *